United States Patent
Schnuckle

(10) Patent No.: US 8,051,590 B2
(45) Date of Patent: Nov. 8, 2011

(54) MAGICAL IMAGE CUPS AND CONTAINERS WITH 3D DISPLAYS

(75) Inventor: Gary W. Schnuckle, Altandena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 12/871,709

(22) Filed: Aug. 30, 2010

(65) Prior Publication Data

US 2010/0321778 A1    Dec. 23, 2010

Related U.S. Application Data

(62) Division of application No. 12/114,012, filed on May 2, 2008, now Pat. No. 7,900,384.

(51) Int. Cl.
| | |
|---|---|
| G09F 3/00 | (2006.01) |
| G09F 19/00 | (2006.01) |
| A47G 19/22 | (2006.01) |
| B65D 1/24 | (2006.01) |
| A63H 27/00 | (2006.01) |
| A63H 33/00 | (2006.01) |
| A63H 33/22 | (2006.01) |
| B29D 22/00 | (2006.01) |
| A47G 1/12 | (2006.01) |

(52) U.S. Cl. ........... 40/324; 40/326; 40/406; 40/306; 40/310; 220/703; 220/506; 446/47; 446/71; 446/219; 428/34.1; 428/13; 359/617; 359/616

(58) Field of Classification Search .......... 40/324, 40/326, 406, 306, 310; 220/703, 506; 446/47, 446/71, 219; 428/34.1, 13; 359/617, 616
See application file for complete search history.

(56) References Cited

U.S. PATENT DOCUMENTS

| | | | |
|---|---|---|---|
| 2,810,978 A * | 10/1957 | Chapman | 40/310 |
| 4,094,501 A | 6/1978 | Burnett | |
| 4,115,939 A | 9/1978 | Marks | |
| 4,613,128 A | 9/1986 | Lasky | |
| 4,922,355 A * | 5/1990 | Dietz et al. | 362/101 |
| 4,928,412 A * | 5/1990 | Nishiyama | 40/324 |
| 5,139,455 A | 8/1992 | Israel | |

(Continued)

OTHER PUBLICATIONS

Optigone Associates, Mirage Model 22 Gigantic 3D Hologram Maker, www.optigone.com, Jun. 20, 2006.

*Primary Examiner* — Joanne Silbermann
*Assistant Examiner* — Syed A Islam
(74) *Attorney, Agent, or Firm* — Marsh Fischmann & Breyfogle LLP; Kent A. Lembke

(57) ABSTRACT

An optical illusion device such as a drinking glass/cup for providing a multi-dimensional visual display. The device includes a body with tubular sidewalls extending from an opening at a first end to an opening at a second end. A base assembly is provided at the second end. The base assembly includes a top wall, a bottom wall, and a sidewall that together form or define an inner chamber. A visual display assembly is provided with a mirror element with a convex reflective surface or mirror positioned within the chamber with the reflective surface facing the top wall of the base assembly. A primary image element is provided proximate to the reflective surface such that the primary image and mirror element can be observed via the opening in the body. A framing element is included proximate to the top wall of the base assembly including background images facing the reflective surface.

14 Claims, 9 Drawing Sheets

U.S. PATENT DOCUMENTS

| | | |
|---|---|---|
| 5,229,884 A | 7/1993 | Kelderhouse et al. |
| 5,257,130 A | 10/1993 | Monroe |
| 5,476,194 A | 12/1995 | Hippely et al. |
| D375,678 S | 11/1996 | Owslany |
| 5,676,401 A | 10/1997 | Witkowski et al. |
| 5,695,346 A | 12/1997 | Sekiguchi et al. |
| 5,758,440 A | 6/1998 | Yudin |
| 5,782,547 A | 7/1998 | Machtig et al. |
| 5,782,698 A | 7/1998 | Keller |
| 5,787,618 A | 8/1998 | Mullis |
| 5,788,579 A | 8/1998 | Cherry et al. |
| 5,799,939 A | 9/1998 | Schneider |
| 5,871,404 A | 2/1999 | Weinreich |
| 5,884,421 A | 3/1999 | Key |
| 5,951,405 A | 9/1999 | Eigenmann |
| 6,050,011 A | 4/2000 | Hess et al. |
| 6,050,414 A | 4/2000 | Saffron et al. |
| 6,080,067 A | 6/2000 | Leff |
| 6,135,654 A | 10/2000 | Jennel |
| 6,272,777 B1 | 8/2001 | Swenson |
| 6,336,725 B1 | 1/2002 | Cianfichi, Jr. |
| 6,581,972 B2 | 6/2003 | Nojima et al. |
| 6,622,878 B1 | 9/2003 | Frey |
| 6,943,953 B2 | 9/2005 | Raymond |
| 6,945,872 B2 | 9/2005 | DeVogel |
| 6,976,678 B1 | 12/2005 | Setteducati |
| 7,001,033 B1 | 2/2006 | Olsen et al. |
| 7,010,877 B2 * | 3/2006 | Geary .................... 40/310 |
| 7,016,116 B2 | 3/2006 | Dolgoff |
| 7,057,823 B1 | 6/2006 | Raymond |
| 2005/0075176 A1 | 4/2005 | DeVogel |
| 2005/0083676 A1 | 4/2005 | VanderSchuit |

* cited by examiner

MAGICAL IMAGE CUPS AND CONTAINERS WITH 3D DISPLAYS

CROSS-REFERENCE TO RELATED APPLICATIONS

This application is a divisional of U.S. patent application Ser. No. 12/114,012, filed May 2, 2008, which is incorporated herein by reference in its entirety.

BACKGROUND OF THE INVENTION

1. Field of the Invention

The present invention relates, in general, to packaging and labeling techniques that produce objects with imagery, and, more particularly, to objects such as containers and cups or to optical illusion devices, and methods for manufacturing such objects and devices, that produce an image that appears displaced from the object's or device's surfaces or produce a composite image that has multi-dimensions or effects such as multi-layered imagery.

2. Relevant Background

Companies marketing their products are continuously searching for better ways to differentiate their product from competitors' products on crowded retail shelves. This is particularly true for products that may be similar in taste, appearance, or other characteristics such as water, alcoholic and non-alcoholic beverages, and many other consumer products including shampoo, liquid soap, and the like. To differentiate their products, these companies have turned to packaging to try to create increased shelf appeal and cause a consumer to select their product over a competitor's product at the point of sale or point of purchase. For example, shrink sleeve labels, wrap-around labels, or other labels may be used to package a consumer product and include colorful images or eye-catching graphics that are intended to attract a consumer and cause them to purchase the product. In some cases, the product or object itself may be configured to provide such graphics. For example, glasses, candles, keepsakes, and other consumer products are often selected based on their appearance rather than their function. A product's packaging or on-shelf appeal is particularly important for products that may be selected based on price or for other factors other than brand loyalty and for products that are new to a market. In these cases, consumers often will select one product over another simply due to the way it is packaged or its appearance.

Products are often packaged in bottles, cans, jars, cups, and/or containers that have an unusual shape such as placing syrup in a bottle having the shape of a person or of a log cabin. Alcoholic beverages such as vodka may also come in unique shapes to attract a consumer's attention. More commonly, an object such as a bottle with a standard shape is used and labels that are colorful or include colorful or graphic images are applied to attract consumers. For example, recent packaging innovations include labels for clear liquid containers that are adapted to allow a consumer to view an image through the container walls and the liquid in the container with the image appearing affixed on the container wall. With these consumer products, an image may be printed on a label that is attached to the back of the product or object or an image may be printed directly onto the back side of the product or its packaging. With some consumer products, wraparound labels are applied that include text on the interior surfaces that is visible through a clear liquid in the container or object holding a product or is visible after a more opaque liquid is removed (e.g., to provide contest results or other information after a beverage is consumed). Packaging may even include labels with lens materials to magnify an image, to create a three dimensional image, and/or to create a moving image. An ongoing challenge is to develop product and packaging innovations that achieve new effects or imagery with little or no increase in the cost of the product or its packaging.

There continues to be a demand for innovative consumer products that increase the shelf appeal of the products. Such innovation may include packaging designs and techniques that provide differentiating imagery or graphics for an object while limiting added packaging costs. In many cases, it would be desirable for the object or its packaging to produce optical illusions. In other words, many consumer products or retail objects would have significantly increased shelf-appeal if the consumer product or retail object was presented in an optical illusion device or was designed such that they were optical illusion devices or produced eye-catching optical effects. A number of efforts have been made to apply reflective material, such as with labels, upon container surfaces to provide concave reflectors or mirror elements so as to provide three-dimensional (3D) effects. However, there are many applications and products where applying reflective material and/or labels to exterior surfaces is undesirable or is ineffective for creating a desired display or effect. Hence, there remains a need for new and improved ways to create 3D and other imagery in consumer and other products.

SUMMARY OF THE INVENTION

The present invention addresses the above problems by providing objects (and methods of manufacturing such objects) such as containers that are adapted for creating multi-dimensional displays or effects such as displaying 3D images with or without animation. For example, an embodiment of the invention provides a unique display in a drinking glass or cup, and the unique display is useful for driving sales of the cup as it provides an exciting point-of-purchase experience, entertains consumers at the point of consumption of a liquid from the cup, and helping parents to encourage their children to finish drinking a nutritious beverage from the cup. The cup or cylindrical vessel is generally configured for containing fluids such as translucent to transparent liquids such as water, soda, juice, or the like or more opaque liquids such as milk. The vessel is also adapted to create a visual effect. To this end, a visual display assembly is provided in the cup or vessel. The display assembly may be thought of as including artwork or images provided on the inner (and, in some cases, outer) sidewalls of the vessel and a specially configured base or bottom assembly. The base assembly includes a bottom lens or window that provides the bottom surface of the cup and is exposed to any liquid contained therein. The bottom lens is generally transparent or at least translucent to allow light to pass to other components within the base assembly. A framing element or layer may be provided on the bottom lens and includes foreground images on the inner surface along with a viewing port or window directing a line of sight into the base. On a rear surface adjacent to or facing the base, the framing element may include background images (e.g., under lens artwork or the like).

Within the base and under the viewing port, a reflector element (or mirror element) is provided with a convex reflective surface and a primary image is positioned proximate to the reflective surface. These elements combine for an observer looking down into the cup through the other end/opening and, in some cases, contained liquid to create a multi-layer, 3D-like, forced perspective scene. The "magic" imagery is achieved in part because the primary image appears to float between the sidewall and foreground images and the background images (e.g., the images reflected back from the underside of the frame element). Magic imagery or optical illusion effects are provided in part because the convex mirror element (e.g., a convex spherical mirror or the like) makes it difficult for a viewer to sense the existence of the reflective surface. The mirror element may be fixed in position (e.g., alignment with the viewing port) or, in some cases, animation is added to the cup facilitating movement of the reflector element such as by allowing the reflector element to pivot or spin on a mounting element or pin with or without assistance by peripherally-located weight(s), by mounting upon a spring or other resilient member, or by allowing the reflector element to float/bob about in a fluid-filled base. With the visual display assemblies of the invention, themed drinking glasses or cups may be brought to a new level to differentiate products through illusion and animation while maintaining a relatively low price and supporting conventional manufacturing techniques of glasses and cups.

In addition to providing drinking cups with scenic elements in their bottoms, the use of visual display assemblies including a convex-shaped reflector element may be provided in numerous other applications such as in containers including soft soap bottles, sport drink bottles, and other containers in which it is desirable to conceal the straw/tube or to use such straw/tube to support the reflector.

More particularly, an optical illusion device or apparatus is provided that is adapted to create or generate a multi-dimensional visual display. The apparatus includes a body having a front sidewall. A mirror element is spaced apart from the front sidewall within an interior portion of the body, and the mirror element includes a reflective surface that faces the front sidewall and that is convex relative to the front sidewall. A primary image element is provided that is positioned proximate to the reflective surface between the reflective surface and the front sidewall. The primary image element and the reflective surface are visible through at least a portion of the front sidewall. The primary image element may be a printed image provided on the reflective surface such as through printing on the surface or it may be applied as a label, decal, or the like. The reflective surface may be spherical or be elongate with an arcuate cross section when viewed along a longitudinal axis of the body. The body may also include a rear sidewall (e.g., a sidewall that extends about a periphery or circumference) such that the front and rear sidewalls join to define an inner chamber for receiving liquid (e.g., a bottle or other container), and the mirror element is positioned within this inner chamber.

A cover or lid (such as a threaded lid of a liquid soap pump assembly or a threaded or snap lid of a drink cup/glass) may be included over an opening of one end of the body. An inlet tube or straw may extend from the cover into the inner chamber with the mirror element extending along and being attached at least partially to the tube/straw so as to conceal the tube from view through portions of the front sidewall. The body may also be formed with a unitary piece of transparent or translucent material such as plastic, ceramic, or glass with the mirror element mounted or positioned within this unitary piece of material(s). Further, a framing element may be provided on or proximate to the front sidewall with one or more background image elements facing inward toward the reflective surface. A substantially transparent viewing window may be provided that is free or partially free of the background images that directs a viewer's line of sight through the body to the reflective surface and the primary image. Foreground image elements may be provided to define the outer boundaries of this window and face away from the reflective surface to be viewed as being on a different plane/in a different dimension than the background images and the primary image (all of which may be viewed concurrently). A light source, such as an LED or the like, may be included in the apparatus to generate light for illuminating at least the primary image, and this light source(s) may be provided in a base of the body and/or on the sides or top/cover of the body.

According to another aspect of the invention, an optical illusion device or container is provided such as a drinking glass/cup or other container. The optical illusion device includes a body with a tubular sidewall extending from an opening at a first end to an opening at a second end. A base assembly is provided at the second end, e.g., to form an inner chamber within the tubular or substantially cylindrical sidewall for receiving liquid. The base assembly includes a top wall, a bottom wall, and a sidewall that together form or define an inner chamber. A visual display assembly is provided that includes a mirror element with a convex reflective surface (e.g., a spherical convex mirror or the like) positioned within the chamber with the reflective surface facing the top wall of the base assembly. A primary image element is provided proximate to the reflective surface such that the primary image and mirror element can be observed by a viewer via the opening in the body at the first end of the tubular sidewall. A framing element may be included in the visual display assembly such as proximate to the top wall of the base assembly, with the framing element including a set of background image elements positioned to face the reflective surface.

A viewing window may be provided in the framing element that provides a line of sight from the opening at the first end of the sidewall to the primary image element and the reflective surface, with the framing surface in some cases including foreground images exposed to or facing the opening of the first end for concurrent viewing with the primary image and background images. The mirror element may be rigidly mounted within the inner chamber or be mounted for movement so as to animate the primary image such as by providing a volume of at least translucent liquid in the chamber and floating the mirror element, mounting the mirror element on a resilient member attached at the other end to the bottom wall of the base assembly, or providing the mirror element with pinwheel-like mounting to pivot on the end of a rigid mounting member attached to the bottom wall of the base assembly.

DETAILED DESCRIPTION OF THE PREFERRED EMBODIMENTS

Figure 1:
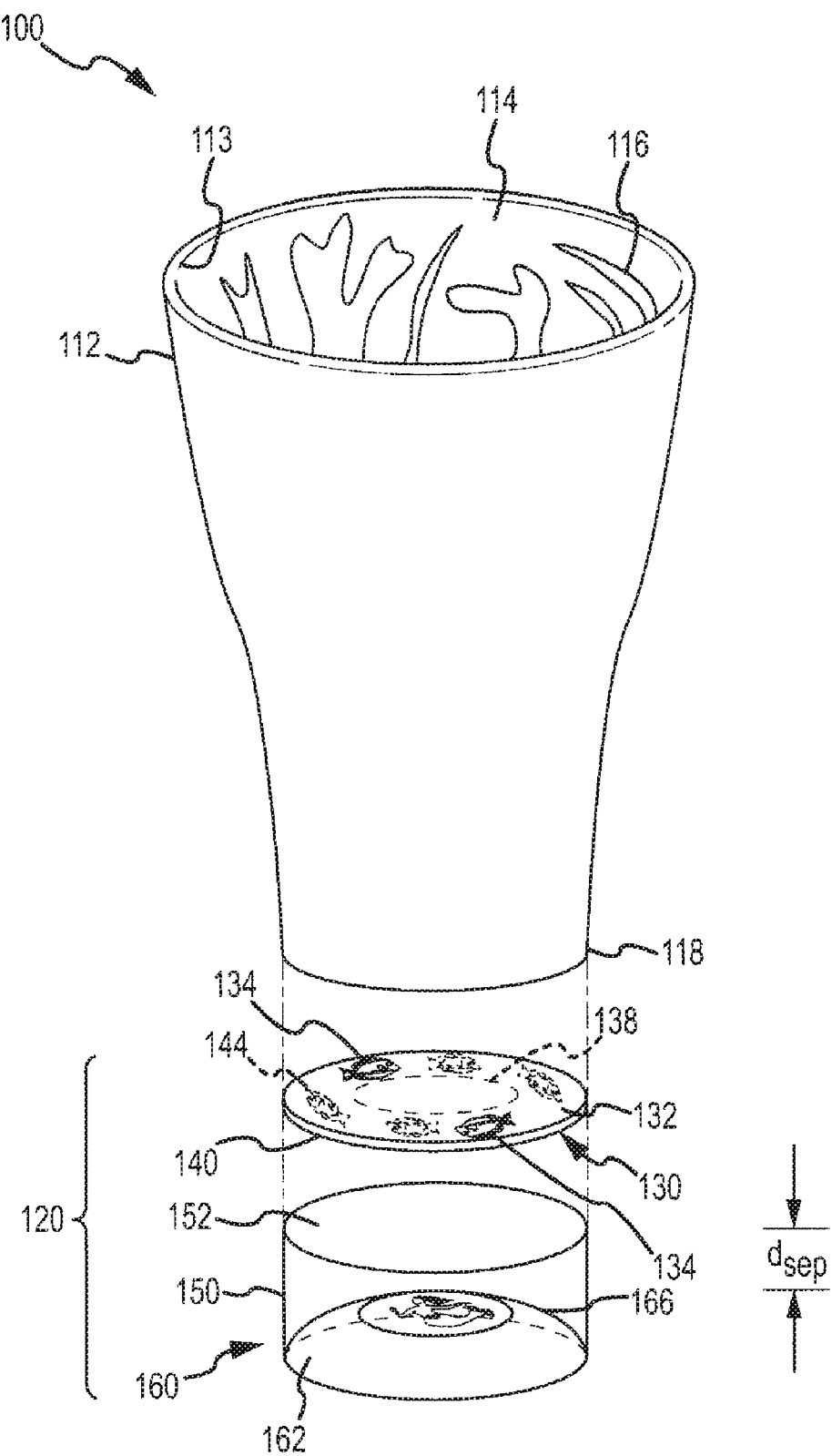
FIG. 1 is an exploded perspective view of a container or cup with a visual display assembly of the present invention for generating an image or graphic display to a viewer outside the container that looks through the open end of the cup toward the cup base.

Briefly, the present invention is directed to optical illusion devices such as objects or products (e.g., drinking glasses, sports bottles, visual display consumer products, soft soap and other containers with straws/tubes, and the like) that are packaged, labeled, and/or designed to create an image that appears displaced from the object's surfaces. The invention is particularly well suited for use with objects or assemblies that have substantially transparent or translucent walls (or at least a portion that is translucent or at least partially transparent) and that may be used to contain or hold clear or translucent liquids, but the invention is also useful for creating displays when the objects or assemblies are emptied, which makes it attractive for use with keepsake, promotional, and reusable products. Devices, objects, products, and the like produced or designed according to the invention are able to achieve such floating, multidimensional, and/or multi-effect imaging by providing a visual display assembly on an exterior or interior surface, as an integral component of, or within a clear or translucent sidewall (e.g., a clear or substantially clear plastic, ceramic, or glass sidewall of an optical illusion device such as a consumer product or retail object).

The visual display assembly used to create these "magic" affects is typically made up of a mirror or reflector element provided at a location that is spaced apart from a translucent front portion of a sidewall or apart from an open portion (such as the open end of a cup/glass or similar open-ended container). The front portion of the sidewall or another aspect of the container may include an optional framing element with a view port or window to direct a viewer's line of sight toward the mirror element. The mirror element includes a convex reflective surface on its interior side (or side exposed toward a viewer and the opening) or side that is placed proximate to the sidewall or other viewing port. A central or primary image is positioned in front of or proximate to the reflective surface, e.g., printed on this reflective surface, sandwiched between the reflective surface and the view port of the framing element (or base lens in some cup applications). The framing element includes a viewing window or port that is transparent and permits a viewer's line of sight to be toward the central image on or near the reflective surface. The framing element also includes background images that may be provided on an interior surface of the framing element such as on the interior of a container sidewall, a base lens of a cup/glass, and/or a label (e.g., a front label or portion of a wraparound label or a label applied to the interior surface of a base assembly of a cup or glass).

The background images are visible through the viewing window as they are reflected off of the reflective surface. The framing element may also include foreground images as separate printed images on an exterior surface of a label or as the reverse side of the printed image used to provide the background images. These foreground images are positioned about the viewing port and are visible from outside the optical illusion device. The inner sidewall surfaces of a container such as a glass may include contours three-dimensional and/or include additional foreground or depth-creating images, e.g., printed imagery on the inner surfaces of a drinking cup may be used to provide additional images that add to the 3D or other visual effect. The resulting display comprises a composite image or display in which the foreground (and/or depth-creating) images appear in front of the central image, the central image appears to be on the rear wall or inside the optical illusion device such as floating inside a drinking cup when viewed through the open end, and the background images appear to be behind the central image. In many cases, the composite image creates an illusion that the primary image is displaced within the container as if it were floating in the optical illusion device or container. The devices, objects, products, assemblies, and the like described herein are in this manner able to effectively create a multilayer or multidimensional display by providing a composite image by combining image components attached to or provided as part of the device. In some embodiments, the visual display is enhanced by optical effects provided by the label, the sidewall, and also inclusion of clear or translucent liquids within the interior portions of the device between the framing or lens element and the mirror element with its convex reflective surface.

In some embodiments, further enhancements of the image are achieved by printing or configuring the images to account for distortions or optical effects due to the sidewall(s), the curvature of the reflective surface, the refractive index and diameter (or width) of the interior space defined by the sidewall(s), and/or other optical parameters. For example, the primary or central image may be printed with more width (i.e., wider) to account for optical effects that cause the image created to be thinner than the printed image, and similarly, the background images may be pre-distorted by printing them with a width that is greater or narrower than desired in the visual display to account for optical effects that cause the viewed image to be different than the printed version.

The framing or lens element may in some embodiments be formed by printing the foreground images on an opaque frame or background on an exterior surface of a label to be applied to a container exterior surface or to a surface of a base assembly or other component containing the reflector element. In such cases, the background may define the clear viewing window (e.g., a circle, an oval, a square, or other useful shape for permitting or directing a viewer's line of sight onto the primary or central image). In these cases, the background images may be provided on the interior surface of the label behind the foreground images but typically not in the viewing window. In other embodiments, the framing element is provided on a clear label (e.g., on the interior surface of the label and/or on the exterior surface of the label) or formed directly on a sidewall or lens element and includes a pattern that is visible both from the exterior of the device and through the viewing window due to reflection. In certain embodiments, the viewing window may not necessarily be a defined shape but simply be provided by the configuration of the printed pattern (e.g., a viewer can view the reflective surface and the primary image and background image through clear portions of the pattern and these clear portions make up the viewing window or portal in these embodiments).

Figure 2:
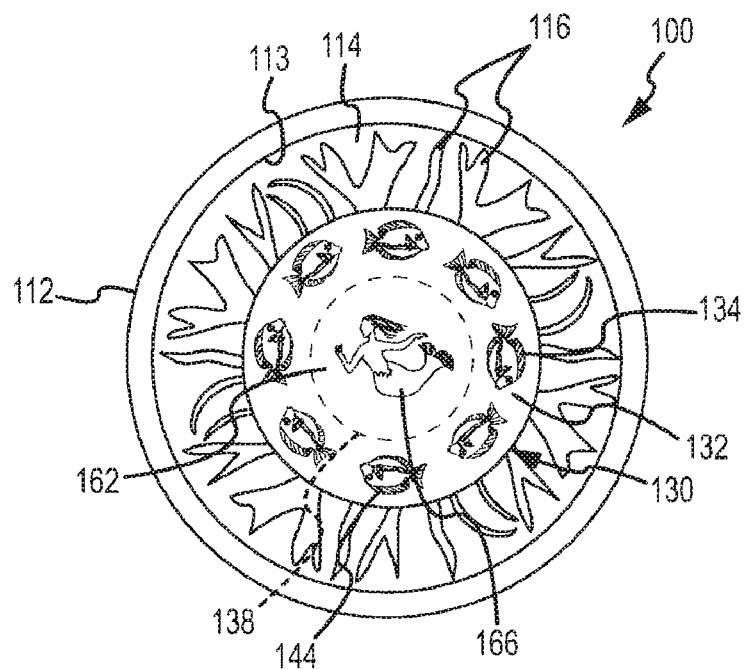
FIG. 2 illustrates the container of FIG. 1 in assembled form viewed from the open end of the cup toward the display assembly provided in the base.

FIGS. 1 and 2 illustrate an embodiment of an optical illusion device or container 100 according to the invention that makes use of properties of convex mirrors to achieve a desired visual display. As shown, the container 100 may take the form of a drinking glass/cup or other elongate cylinder or tube with an open end (or an end with a transparent/translucent cover) for viewing the display provided in the base or bottom of the cup. As shown, the container 100 includes hollow, generally cylindrical sidewall 112 with an opening 113 at a first end and at a second distal end 118. In some cases, the sidewalls 112 are cylindrical (e.g., with the same diameter throughout) while in others the opening 113 may be larger than the opening at base end 118 (e.g., the diameter of sidewall 112 may be smaller at 118 as is often the case with drinking or stadium-type glasses). The container 100 is adapted to create a multi-dimensional or 3D display, and, to this end, the inner surface 114 of the sidewall 112 may include artwork or foreground, depth-creating images 116, which may be printed images, labels/decals, images formed with the walls 112, or the like that are substantially planar or be recessed or raised from the surface 114 to create a desired effect. In the undersea example shown, the images may provide images of items found nearer to a surface of water such as the water itself, fish, plants, coral, and so on with items found nearer to the bottom of water provided near end 118 of sidewall 112 such as sand, rocks, bottom-dwelling creatures, and so on. In this manner, an effect of depth can be provided in other scenes/applications, and such depth with images 116 is useful for creating a 3D effect when a primary image is reflected so as to appear to be displaced or spaced-apart from the end 118 (e.g., to float within the cup 100).

A visual display assembly 120 is attached to the end 118 of the sidewall 112 (or inserted into the sidewall 112 similar to a plug or the like to be flush with end 118). Note, the artwork/images 116 provided on sidewall 114 may be considered to be an element of the display assembly 120 and so may an optional cover/lens (not shown) that may be provided over or at the opening 113 in some applications. The display assembly 120 includes a base or bottom assembly 150 with a surface 152 that is positioned proximate to the end 118 to face the interior of the cup 100 (e.g., to contact liquids contained in the cup 100 or to provide the bottom surface of the cup 100). The surface or top wall 152 may be planar or be somewhat curved such as concave or convex as is common in many drinking glasses (e.g., the bottom surface 152 may bulge inward a small amount so as to provide structural strength to a plastic implementation of the container 100 but this is not required to practice the invention).

The visual display assembly 120 further includes a framing element 130 that may be a label or be a layer(s) of ink applied to the surface or top wall 152 (or be provided on the inner portion of base 152 to avoid contact with liquids in the container 100 when the container 100 is a drinking glass). The framing element 130 may include a frame (or exterior-viewable) portion 132 that may be substantially opaque in some cases to provide a backdrop for foreground images 134 that may be observed by a viewer through the opening 113 (e.g., the opening 113 may be considered a first viewing window or portal for container 100). Additionally, a viewing window or portal 138 is provided in the frame 132 and may be an actual defined transparent or translucent portion of the framing element 130 with edges/boundaries defined by the frame 132 as shown or may be a more irregularly shaped window or space through the foreground figures or images 134. On an underside or back surface 140 of the framing element 130, one or more background images 144 are provided that are facing and proximate to the surface 152 and/or to the interior of the base 150 and reflective surface 162.

The viewing window 138 is used to direct a line of sight of a viewer looking through the opening 113 toward or into the base 150. In this respect, the framing element 130 along with the top wall 152 may be considered a bottom lens or window of the container 100 into the base 150. The bottom 150 typically is formed of substantially transparent or at least translucent material such as glass, ceramic, and plastic to allow light to pass from the inner portion of the container 100 into the base 150 through the lens or top wall 152. The sidewalls of the base 150 may also be clear or translucent to allow light to pass into the base 150 (e.g., to light the primary image 166) or may be colored to be less transmissive to light or to even be opaque to hide the display assembly 120 components from a user of the container (e.g., to facilitate the illusion or magic effect). In some embodiments, the base 150 may include one or more light sources (not shown) such as light emitting diodes (LEDs) that direct white or colored light onto the primary image 166 and/or onto the background images 144.

Significantly, the visual display assembly 120 includes a mirror element 160 that is shown in FIGS. 1 and 2 to be mounted rigidly onto the base 150 (e.g., distal or spaced apart by a separation distance, $d_{sep}$, from the top wall or surface 152 and framing element 130). The mirror element 160 includes a convex mirror or reflective surface 162 that may cover a portion or all (as shown) of the lower or bottom of the base 150 (e.g., have same or smaller diameter as the base 150). The convex reflective surface (or diverging mirror) 162 is generally a curved mirror in which the reflective surface 162 bulges toward the opening 113 or the light source or light passing through the opening 113 (note, in some cases, the sidewall 112 is adapted to block light and in other cases light is allowed to pass through the sidewall 112 or may even include light sources (e.g., LEDs) or light directing elements/lenses or the like). In other words, the center of curvature is some distance behind the surface 162 (or opposite the framing element 130). In addition to the convex reflective surface 162, the mirror element 160 includes a primary image 166 that is provided in this embodiment as a printed image or label/decal positioned on or abutting the surface 162 (e.g., centrally positioned upon the mirror element 160 and aligned with the viewing window 138). By selecting the separation distance, $d_{sep}$, the position of the foreground images 134 in front or relative to the displayed/viewed image 166 in the container may be controlled as well as the position of the background images 144 that are reflected from the surface 162 to the viewer through the framing element 130. FIG. 2 illustrates displayed imagery as may be seen through the opening 113 of container 100 by a viewer. As shown, a set of foreground images is presented by the sidewall images 116 as well as the images 134 on the framing element 130. Further, the primary image 166 is displayed through the viewing window 138 of the framing element 130 and appears to be spaced apart from the bottom or base 150 of the glass/cup 100. Yet further, the background images 144 are reflected from the surface 162 through the viewing window and may appear to be behind the primary image 166 (e.g., may appear to be behind the reflective surface 162 depending upon the size of the separation distance, $d_{sep}$). The actual effect and location of the various images will also depend upon the amount of curvature provided for the reflective surface. In some embodiments, animation of the foreground images 134 and/or background images 144 is provided such as by providing these images as solid objects that are suspended in liquid in the framing element 130 (such as in two separate layers with the foreground image elements 134 in a layer near the surface 152 and the background image elements 144 in a layer near the surface 162) or otherwise mounted for movement (such as on springs/resilient or flexible mounts, as pinwheels, or the like). Likewise, the side image elements may be provided wholly or in part in a clear or colored liquid contained within sidewall 112 to provide animation to these foreground features.

Figure 3:
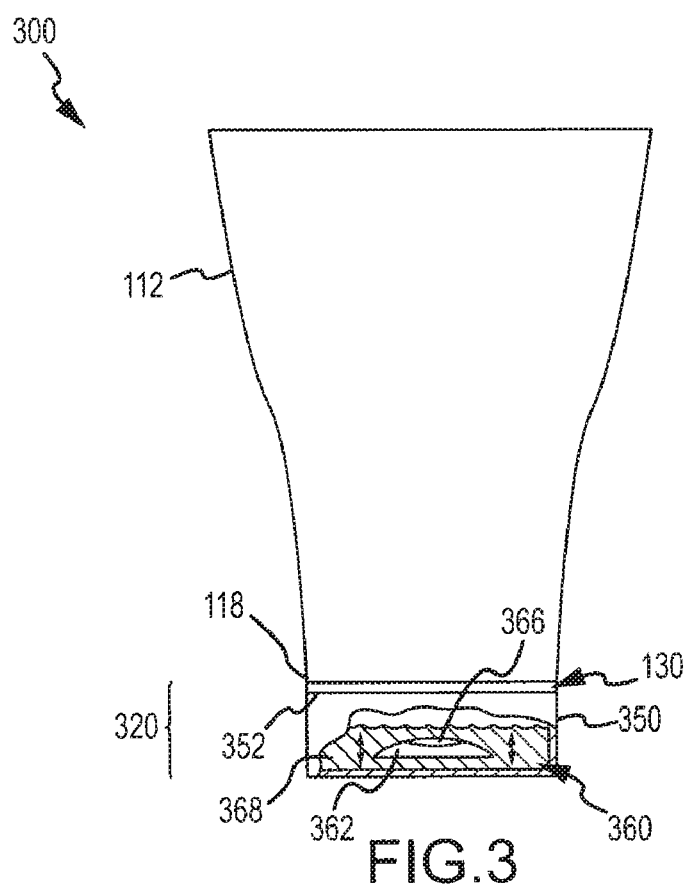
FIG. 3 is a side view of a container or cup similar to that shown in FIGS. 1 and 2 but including a modified base/display assembly that provides animation of the primary image with a floating reflector element.

Animation of the visual display may be provided by allowing the mirror element to move rather than providing rigid mounting as shown in FIGS. 1 and 2. For example, FIG. 3 illustrates another embodiment of a container 300 with a visual display assembly 320 adapted for animation, with shared aspects or elements such as the container wall 112 having similar numbering as in FIGS. 1 and 2 and not described in further detail. As shown, the display assembly 320 includes a base or bottom assembly 350 with a top surface or wall 352 (again that may be planar or curved to be concave or convex), and the assembly 350 includes a chamber or void space in which a liquid 368 may be provided or contained. The liquid 368 typically would be at least translucent to light and may be colorless or be tinted/colored to achieve a desired effect. The assembly 320 also includes a mirror element 360 with a convex reflective surface 362. In this embodiment to allow movement the surface or mirror 362 has a diameter (or width) that is less than the diameter of the base 350 (and also a thickness that is less than the depth of the void space or chamber containing the liquid 368). A primary image element 366 is provided upon the reflective surface 362 (e.g., at the central portion facing the top wall or surface 352 of the base). Animation or movement of the primary image 366 (and background images in some cases) is created when the mirror 360 bobs or moves about in the liquid 368 such as when the cup 300 is shaken or moved by a viewer looking through the opening 113 of sidewall 112. The framing element 130 is provided to present foreground images, a viewing window (or line of sight areas), and/or background images.

Figure 4:
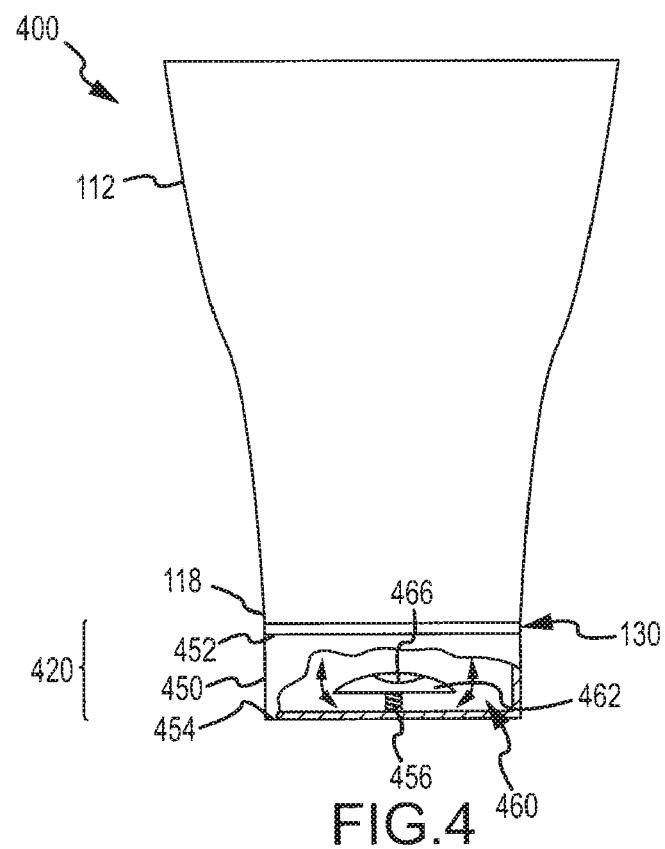
FIG. 4 is a side view similar of a cup or container similar to FIG. 3 showing use of a spring (or resilient member) to mount the reflector element to a surface of the base.

FIG. 4 illustrates another container 400 with a visual display assembly 420 providing animation or movement of the primary image. As shown, the base assembly 450 is configured with a chamber between a top surface 452 and a bottom surface 454. The mirror element 460 is positioned within this void space and includes a convex shaped reflective surface 462 and a primary image element 466 on this surface 462. In other embodiments, the primary image 466 may be positioned apart from the surface 462 such as nearer to the top wall 452 or nearer to the bottom wall 454. The mirror element 460 is mounted to the bottom surface 454 with a resilient member 456, which is shown in this embodiment as a spring but other resilient members may be used such as flexible rods. Again, the mirror element 460 is sized with a diameter that is less than the diameter of the base 450 and a thickness less than the depth of the void space or chamber to facilitate a desired range of movement of the mirror element 460 in the base 450. In use, the mirror element 460 moves or wiggles on the spring 456 as the cup/glass 400 is moved or shaken by a user or viewer, and the movement causes the primary image 466 to move and, in some cases, the background or reflected images to also move.

Figure 5:
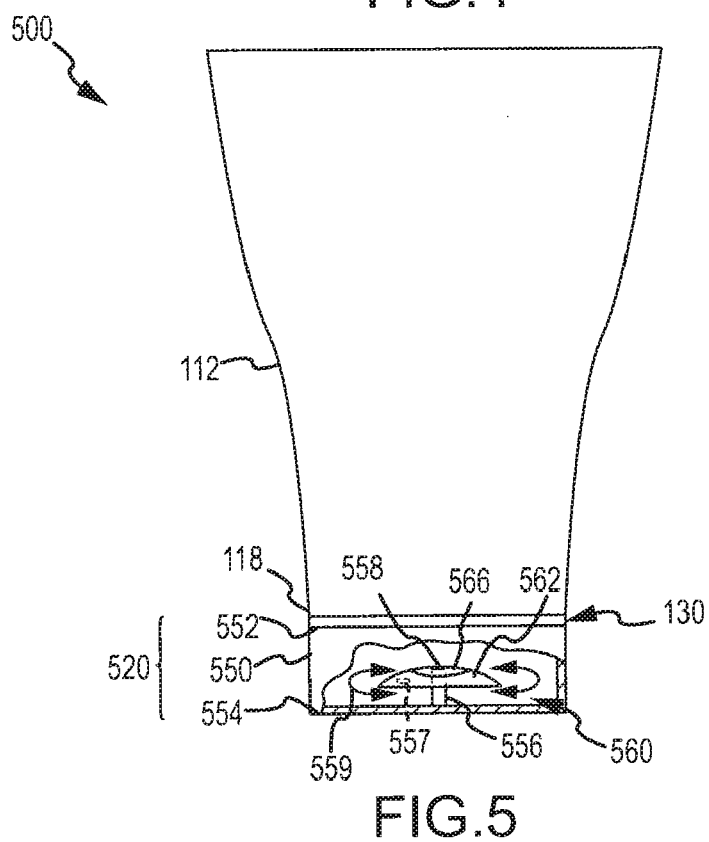
FIG. 5 is a side view similar to FIGS. 3 and 4 of a cup or container showing use of a pinwheel-type mounting of the reflector element to create animation/movement with a spinning or rotating reflector surface.

FIG. 5 illustrates another container 500 with animated 3D visual imagery. In this embodiment, the visual display assembly 520 is made up of a base assembly 550 that again includes a chamber or void between a top wall/surface 552 and a bottom wall/surface 554. The mirror element 560 includes a convex reflective surface 562 facing upward into the cup 500 with a primary image 566 printed or provided (such as a decal/label or the like) on or near the surface 562. The mirror element 560 may be configured to spin or rotate by mounting to the bottom 554 via pin or rod 556 that passes through the surface 562 at 558 such as when 556 is a pin or similar component (or element 558 may be a connector to the rod 556). Optionally, one or more weights or counterweights 557, such as at or near the periphery of the surface 562 (but typically on a back or underside surface of the element 560), may be provided to cause the spinning 559 about the connection 558 or pin/rod 556 when the container 500 is moved by a user viewing the image 566, e.g., the weight(s) 557 may encourage spinning as they respond to gravity to move the surface 562 to place the weight 557 near the "bottom" of the base chamber as it may be rotated about its longitudinal axis.

In some embodiments, the containers, cups, or glasses of FIGS. 1-5 are replaced with a solid object (e.g., a block, a rod, or the like) and a visual display assembly is provided on and/or in the solid object (e.g., the solid object may support the components of the visual display assembly and also act as a lens). For example, a label or labels providing all or portions (e.g., the frame element) of the visual display assembly with its framing element and mirror element may be applied to a cylinder formed of a clear or translucent material such as a glass, ceramic or plastic (e.g., acrylic or the like) rod. The use of a cylindrical object in place of the open/hollow containers of FIGS. 1-5 achieves similar or, in some cases, improved visual effects/results because the optical characteristics of the solid object are more readily understood and selected to achieve a desired effect when compared with a liquid provided in a container.

Figure 6:
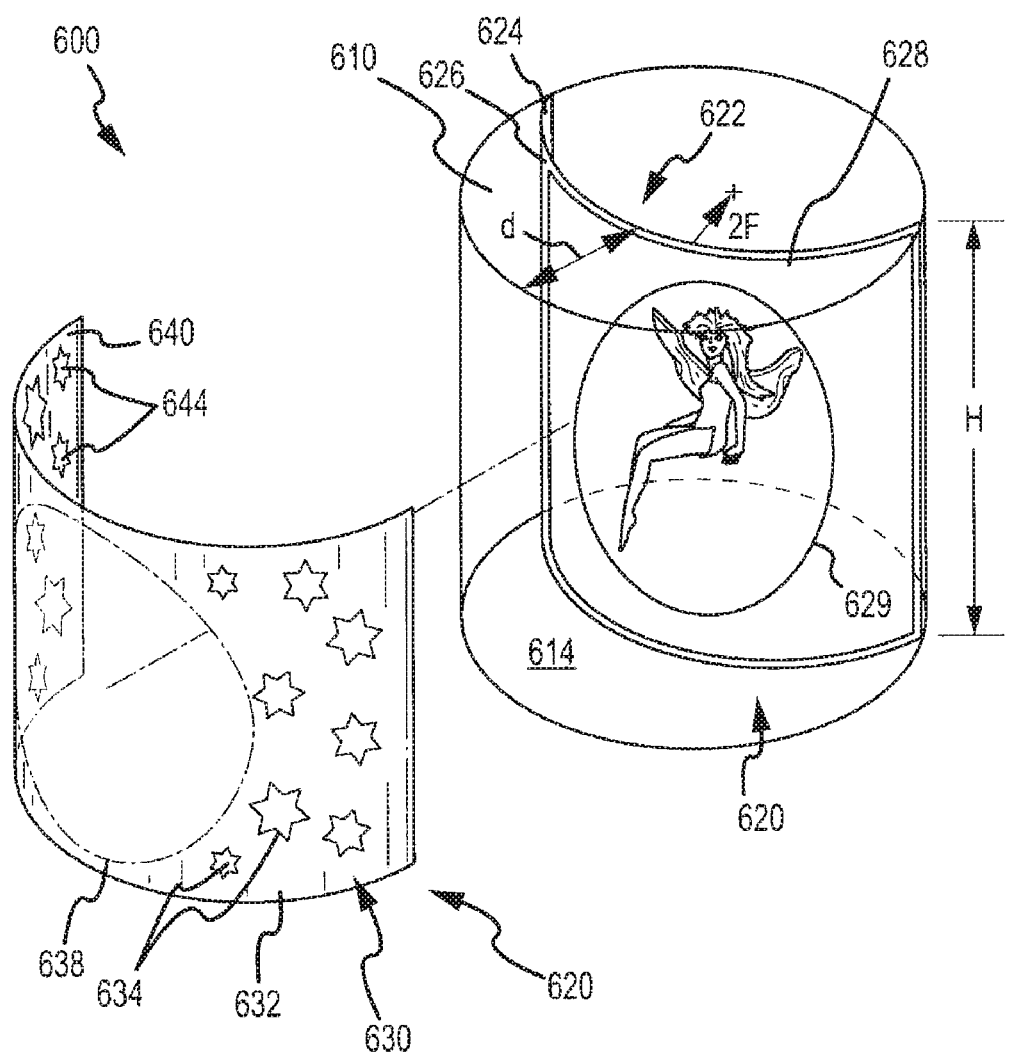
FIG. 6 is an exploded view of a display device using a solid body or block to support the visual display assembly including an elongate, convex reflector positioned within the solid body.

FIG. 6 illustrates an optical illusion device or object 600 that includes a solid or substantially solid body 610 with a "front" portion or sidewall 614. The device 600 includes the visual display assembly 620 that includes a frame element 630 that is attached or provided on the front sidewall 614 of the body 610. A mirror element 622 with an elongate (e.g., the mirror element may be spherical or more elongate as shown to extend a fraction of or the entire height of the body 610) and convex reflective surface 628 is provided or positioned within the block/body 610 such as spaced apart a distance, d, from the front sidewall 614 and frame element 630. A primary image 629 is provided on the surface 628 or within the block 610 (such as "floating" between the surface 628 and surface 614/framing element 620 or behind the surface 628 such as within the body 610 or on a back surface of the body 610 with the surface 628 including a second view port of transparent material or a hole/opening lacking reflective material or otherwise as described herein). The body 610 is shown to have a cylindrical configuration with a circular cross section (when viewed along its longitudinal axis) but many other cross sectional shapes may be used such as oval, elliptical, square, rectangular or the like (with some of these providing the framing element 620 in a more planar form rather than having a shape similar to and, in some cases, parallel to the mirror element 622). The frame element 630 may be flexible or conformable (e.g., a label or decal) and when applied or attached to the sidewall 614 the element 630 may generally conform to the shape of the body 610 and sidewall 614.

In addition to the curved, convex reflective surface 628 (e.g., with a curvature shown as 2F), an optical illusion is achieved by the use of body 610 as an optical element or lens, which in this case is cylindrical. The body 610 (at least at the portion between the frame and mirror elements 622, 630) is clear or substantially transparent/translucent and may be formed of plastic (such as an acrylic or the like), glass, ceramic, or the like or some combination thereof that provide desirable optical characteristics. The convex nature of the mirror element 622 generally positions the primary image 629 nearer to the window 638, which makes getting light to the image easier, which makes the image sharper and may be desirable if light is lost significantly in body 610 (e.g., depending on the material chosen and whether tint is provided). The separation distance, d, may also be selected to achieve a desired effect and/or to provide adequate lighting of primary image 629 and reflective surface 628. Also, some embodiments may include light sources (not shown) such as in a base element that directs light up into the body 610, in a cover that directs light down into the body, and/or with side-mounted lights that direct light onto one or both sides 624, 626 of the mirror element 622.

In some cases, it may desirable to encase all or a portion of the visual display assembly within the optical illusion device or object. For example, the visual display assembly in a container may be provided within the sidewalls (such as with a hollow sidewall) or be provided on the interior surfaces of the sidewall rather than on the exterior as is shown in FIG. 6. If a solid body is used as is the case in FIG. 6, the framing element and/or the mirror element may be embedded or otherwise positioned or provided within the body itself. In embodiments not shown, the body may have a square (or non-circular) cross section such as rectangular, triangular, or other shape may be used to practice solid or partially solid-body applications of the invention. These other cross sectional shapes may be utilized in part because the visual display assembly is positioned within the body and is arranged to have a nonplanar or arcuate cross section as was the case of the assembly 620 in FIG. 6, with the framing and mirror elements having a radius (e.g., the same radius is typically used but the framing and mirror elements may have differing radii in some cases). A relatively thick substrate may be used for the mirror element and frame element to provide a desired level of rigidity, and these elements may be positioned in a base in an arcuate configuration. The body may be formed, poured, or molded about the framing and mirror elements. In this manner, the embedded visual display assembly provides a convex elongate or spherical reflective surface that faces the backside of framing element so as to reflect background images provided on this back or inner surface of the framing element. A primary image may be provided on or proximate the reflective surface as discussed above and may be flat or thin and have the same cross sectional shape as the reflective surface. The framing and mirror elements may be offset from the exterior surface of the rear and front sidewalls of the body, respectively, such as at distances that may be equal or differ to practice the invention and range from a few mils up to half an inch or more. Solid body-type devices such as that shown in FIG. 6 or described in this paragraph are useful for illustrating that the visual display assembly of the invention can be used in a wide variety of products to achieve an optical illusion as long as the convex mirror element and its reflective surface and primary image can be seen through a container, product or object body, or the like. Typically, a framing element is also provided but can be provided on an external surface, on an interior surface, as part of the products exterior walls, or embedded in such a wall or body of the device.

In some embodiment, a visual display assembly may be utilized not only to create a desirable multi-dimensional visual display but to also create an illusion or effect to hide portions of the structure of a device or container. For example, there are presently many containers that include straws or tubes that extend from a cover or pump element into the container such as to allow the liquid to be drank (such as in many portable or sport drink bottles) or to be pumped out (such as with a soft soap or similar container). To differentiate one such container from another at the point of sale or point of use, it may be desirable to both hide the straw/tube but also to disguise how such concealment is achieved. With such a goal in mind, some embodiments of the invention provide an elongate, convex mirror element adjacent and, in some cases, attached to the straw/tube such that a person looking through a side of the container sees a visual display but no (or only portions of a) straw/tube.

Figure 7A:
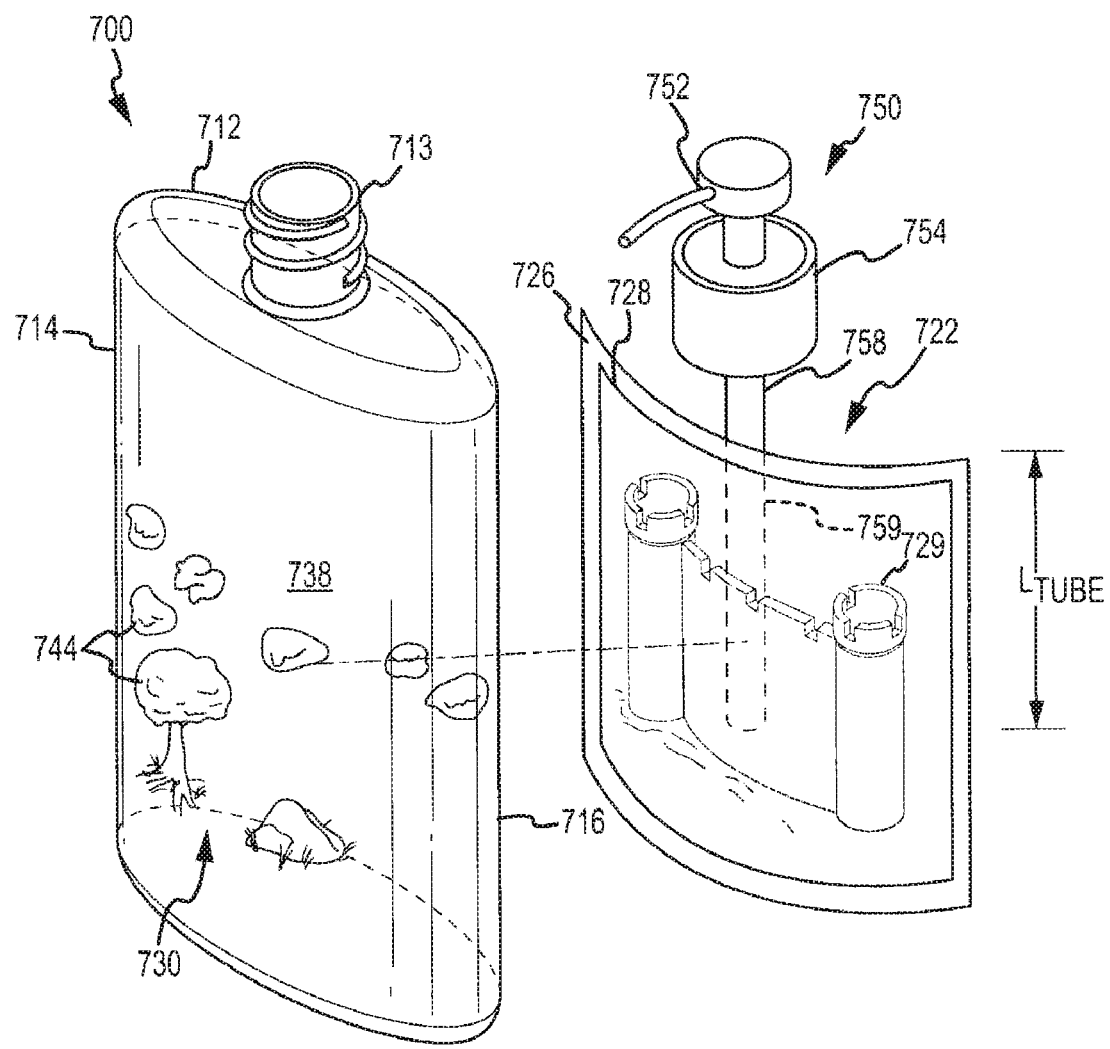
FIGS. 7A and 7B illustrate a container, such as a soft soap or similar bottle, configured with a display assembly according to an embodiment of the invention with a concave reflector attached to the pump assembly tube.
Figure 7B:
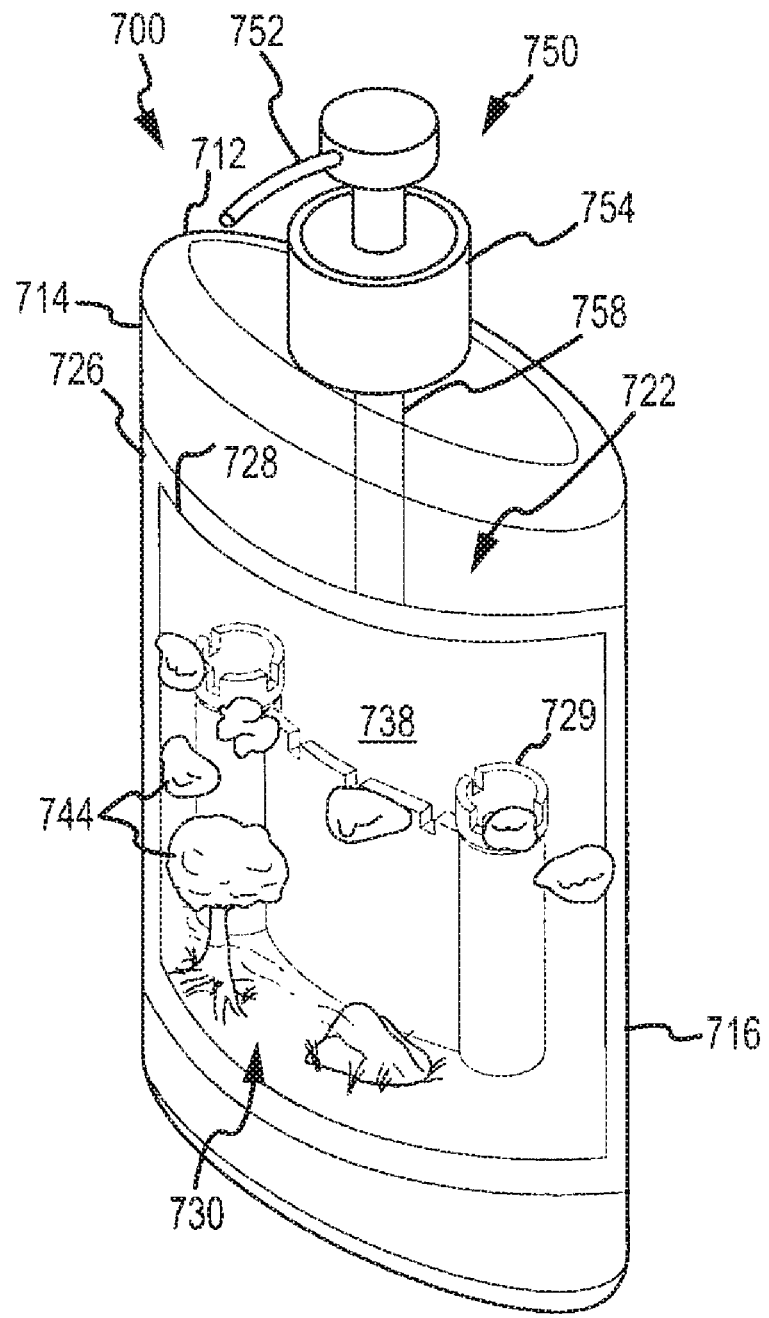

FIGS. 7A and 7B illustrate a container 700 adapted to conceal an inlet straw or tube 758 with a multi-dimensional display screen. As shown, the container 700 takes the form of a bottle such as may be used for liquid soap or other products that are dispensed with a pump assembly 750. The container bottle is provided by a sidewall 712 with a front portion or front sidewall 714 and a rear portion or rear sidewall 716 (e.g., the front portion is adapted to allow a user to view the contents of the container 700 while the rear portion may provide product information and be less likely to be transparent). The container 700 further includes a threaded opening or top 713 for receiving a threaded portion 754 of the pump assembly 750. The pump assembly 750 also includes a pump lever or trigger 752 with an outlet or spout and an inlet straw or tube 758 that extends from the pump lever 752 for insertion through the opening 713 into the void or chamber provided within the sidewall 712 of the container 700 (e.g., with an opening of the tube 758 positioned near the bottom of the container 700 when the threaded portion 754 is mated with the threaded opening 713).

A visual display assembly is provided with a mirror element 722 and a framing element 730. The framing element 730 in this embodiment is provided as images printed directly upon the exterior surface of the front sidewall 714 (but could readily be provided with a label and/or decals). As shown, the framing assembly 730 includes foreground images 744 (which may also act as background images if/when they are reflected by the mirror element 722). The framing element 730 also includes a viewing window or port 738 defined by blank or at least translucent spaces between the foreground images 744 that allow a viewer's line of sight to be directed into the internal void or chamber of container 700.

Significantly, the visual display assembly includes a mirror element 722 with a depth or length that extends along a length of the tube, $L_{tube}$, to hide or conceal this portion of the tube 758. The mirror element 722 includes a front surface 726 facing or proximate to the framing element 730. A reflective surface 728 is provided on the surface 726 and may cover substantially all or a smaller portion of the surface 726 and may take the same shape as the surface 726 or a different shape. The mirror element 722 is shown to be rectangular but other shapes may be used. A primary image 729 is printed on or otherwise provided on the reflective surface 728 such as with printing of ink or with a decal/sticker/label that is attached with adhesive or other mounting techniques. The image 729 may be centrally positioned on reflective surface 728 or be off-center in some cases and may be a single image or two or more images. The mirror element 722 may be attached along the entire or portions of the length, $L_{tube}$, of the tube 758 such as with an adhesive or other attachment methods.

In practice or assembly, the mirror element 722 is typically formed of a material with memory (e.g., that attempts to return to a curved or more planar shape) and is wrapped about the tube 758 after being affixed to the tube 758 to allow the tube 758 and mirror 722 to be inserted in the opening 713 (such as after a volume of a liquid product has been injected or inserted into the container 700). Once inserted, the sheet or mirror element 722 folds or expands back to its more planar shape as shown in FIG. 7B. In this form, the reflective surface 728 provides an elongate but convex shape relative to the front sidewall 714 and framing element 730 (e.g., such as about the shape of the front sidewall which may be an arc of a relatively large diameter circle or a semicircle), and the sheet or mirror 722 may be prevented from becoming fully planar or at least concave by providing it with a width that is greater than the width of the container sidewall 712 (e.g., such that the sides or edges of the mirror element 722 abut or contact the inner surfaces of the sidewall 712 to set or define its convex shape and/or its amount of curvature). Typically, the primary image 729 is offset from the front sidewall 714 and framing element 730 by about half the diameter or thickness of the bottle 700 as shown. In use, a viewer observes a multi-dimensional display created by the visual display assembly as the viewer sees the foreground images 744 in a first plane, looks through the viewing port 738 to also see the primary image 729 in a second plane behind the foreground images (e.g., within the void space defined by the sidewalls 712), and concurrently sees the backs of the images 744 as background images that appear behind the primary image 729 when they are reflected off of the convex reflective surface 728. The inlet tube 758 is hidden through the length, $L_{tube}$, covered by the mirror element 722, and this optical illusion can be quite effective with proper design of the framing element 730 and sizing and shaping (e.g., curvature) of the reflector surface 728. As discussed, a similar arrangement may be used with other containers that include tubes/straws or other features within the void space or chamber defined by the sidewalls 712 and such effects may be used simply to hide the contents themselves, which may involve providing differing support structure for the mirror element 722 if a straw or tube 758 is not present in a container.

In some other embodiments, the convex mirror element may be combined with a magnifying lens provided as part of the framing element such as within the viewing window or port (e.g., the window itself may be a magnifying lens). While in other cases, the magnifying lens is provided as a separate component nearer to the viewer (i.e., further or more distal to the reflective surface and the primary image) or between the viewing window and the primary image/reflective surface. The use of a magnifying lens may be useful to achieve a desired optical effect, which may include further hiding or disguising reflection of a viewer's face or other items near or behind the viewer as they look into the viewing window as such reflection of a viewer's face or eyes can lessen the optical illusion as it gives away the use of a mirror to achieve the effect. In other embodiments, the reflective surface may not be convex as shown in FIGS. 1-7 but instead be concave or planar (or substantially planar) to achieve a useful visual display.

Figure 8:
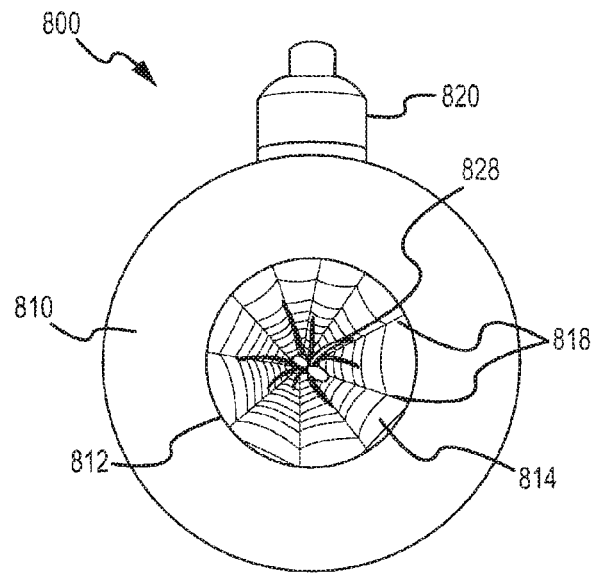
FIG. 8 is side view of a container (e.g., a canteen) with a visual display assembly according to an embodiment of the invention using a planar reflector/mirror in combination with a spaced apart lens element.
Figure 9:
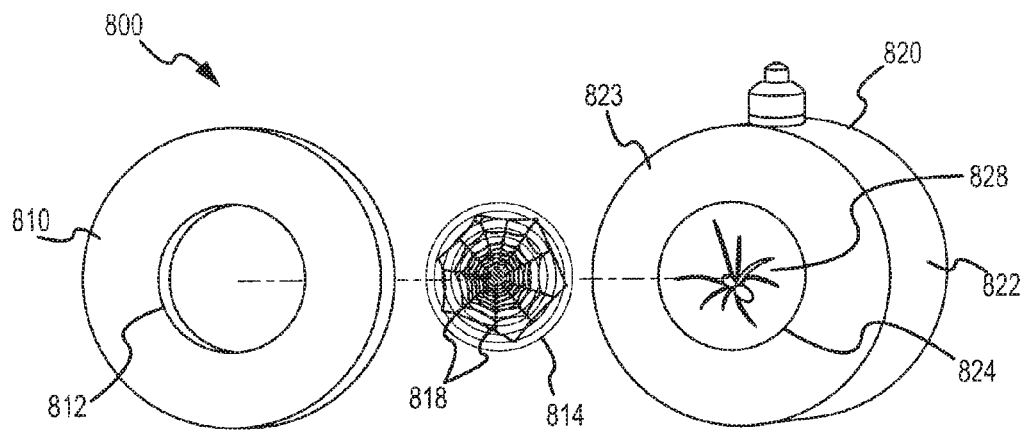
FIG. 9 is a partially exploded view of the container of FIG. 8.

For example, FIGS. 8 and 9 illustrate an optical illusion device or container 800 of an embodiment of the invention that combines a magnifying lens (i.e., element 814) with a spaced-apart or offset, planar mirror element (i.e., element 824) to provide a unique visual display that hides the use of a mirror. As shown, the container 800 takes the form of a canteen or similar product/toy for holding a volume of liquid in a body 820 with an inner chamber or void space defined by a sidewall 822. A faceplate or frame structure 810 may be mounted or attached to the sidewall 822 such as adjacent or covering a display surface 823 (e.g., a planar or curved surface upon the body 820 that is to be used for displaying imagery to a viewer through the frame structure 810) on the sidewall 822. The faceplate 810 may be arced or semi-spherical in shape so as to create a spacing or separation distance between its outer surface, which includes an opening or hole 812 for receiving a lens 814, and the display surface 823 (e.g., a few mils up to 0.75 inches or more depending upon the configuration of the lens 814 and the particular effect being created with container 800).

As shown, the lens 814 is mounted to the faceplate 810 such that at least portions of it extend through or are at least proximate to the opening 812 (e.g., are flush with the exterior surface of the faceplate 810 or are somewhat raised or recessed). The faceplate 810 provides the function of the framing elements in previously-discussed embodiments and foreground images (not shown) may be provided on its exterior such as with printed/painted images, labeling, molding 3D surfaces in the faceplate 810, and the like. The hole 812 with the lens 814 provides a function similar to the viewing windows of other embodiment as the lens 814 directs a viewer's line of sight on to the display surface 823. Additional foreground images 818 may be provided on the outer surfaces of the lens 814 or the images 818 may be provided upon the back or inner surface of the lens 814 to provide foreground and also background images when they are reflected by the mirror surface 824.

The lens 814 is generally selected to be a magnifying lens and focus at about the display surface 823 and magnify a primary image 828 provided on this surface. More specifically, the primary image 828 is typically positioned upon a reflective surface or mirror element 824 that is aligned with the position of the lens 814 (e.g., the element 824 is centered upon the display surface 823 when the lens 814 is centered on the faceplate 810 to align these two components). The mirror element 824 typically will take the shape of the display surface 823 which may be somewhat curved to provide a concave or convex surface or to provide a substantially planar mirror as is the case in some preferred embodiments. The mirror element 824 may have a variety of shapes to practice the invention (e.g., such as a shape similar to that of the lens 814 or to the area focused upon by this lens) and typically is selected to be large enough in size to cover the entire area visible through the lens 814. However, in some embodiments, additional images are provided on the display surface 823 about the periphery of the mirror 824 and in these cases the mirror element 824 may be smaller in size than the lens 814 or its focus area. In some embodiments, the lens 814 takes the form of a Fresnel lens as shown but other lens configurations may be utilized to practice the invention. A useful feature is that the lens 814 is providing magnification that enlarges the primary image 828 to the viewer placing the image 828 in a different plane when viewed than foreground/background images 818. Also, the magnification alters the typical focal length of a planar or other shape mirror element 824 such that at a normal viewing distance (such as a few inches up to about 2 feet) the viewer does not readily see their own reflection, which conceals the working components providing the optical illusion in a desirable fashion. In this embodiment as well as the other embodiments of visual display assemblies, the primary image 828 may be provided in a number of ways such as with printed images directly upon the mirror element 824 or with a decal/label applied to the element 824. In other cases, the mirror element 824 may be provided with the image 828 through use of laser hologram techniques similar to that used with credit cards and the like.

As noted in the first paragraph, U.S. patent application Ser. No. 11/463,941, filed Aug. 11, 2006, entitled "Optical Illusion Device," is incorporated herein by reference in its entirety. That application describes in detail use of concave reflective surfaces in a variety of applications to create visual effects. With the description of FIGS. 1-9 of this application understood, it may be useful now to discuss the description provided in the previously-filed and incorporated reference to better understand a number of other embodiments of the present invention as well as configuration and manufacture of those shown in FIG. 1-9. Figures are not presented at this time because it is believed that the following discussion along with an understanding of the embodiments of FIGS. 1-9 will make such alternative or additional embodiments of the invention clear to one skilled in the art.

Specifically, in addition to the container shown in FIGS. 1-5 and 7A-9, a typical water bottle-type container may be adapted to practice the invention with a convex-reflective surface provided within the container (even without a straw) or on a back wall or surface if the container is not convention but instead includes a convex rear surface (e.g., similar to some flask designs). For example, a container may include a sidewall with a first or front portion and a second or rear portion. Of course, the designation of "front" and "rear" for a container or other object may be relatively arbitrary and should not be considered limiting of the invention with the intent being to describe two generally opposing portions, such as sidewalls, of a container or object. The sidewall is used to form a bottle or jar (e.g., a standard water or beverage bottle, a consumer product container, or the like) with a cylindrical cross section with a radius. The shape of such bottle or jar may take many forms to practice the invention and the radius may also vary widely, such as 0.25 inches to a few inches to up to a foot or more. The sidewall typically is formed of clear or translucent materials such as clear or lightly colored plastic, ceramic, or glass. Sidewall may be single walled or comprise multiple walls. The thickness of the sidewall is not limiting to the invention but its thickness and material properties are typically considered in achieving a desired visual effect (e.g., by considering the refractive index of the container sidewall).

The container may include a visual display assembly similar to that shown FIGS. 1-5 in its bottom or base or more typically as shown in FIGS. 6-7B for creating a multilayer or multidimensional display with a convex reflective surface combined with a framing element. The visual display assembly in such embodiments may be formed of two separate components that may be thought of as a mirror element and a framing element, which are mounted, attached, or otherwise deposited, such as with adhesive to a rear portion or wall or an internal chamber or receiving slot and to a front portion of the sidewall, respectively. The framing element (and, in some exterior labeling embodiment for the mirror element) by heat shrinking of a label or labels containing parts of the visual display assembly, by tacking the mirror element and applying a label or labels over the mirror element, or any other useful method for providing the visual display assembly and its components on or within a container or other object. The mirror element (such as element 622 or 722) may include a label substrate (such as a plastic such as, but not limited to, polyethylene terephthalate (PET), polyethylene (PE), polyvinyl chloride (PVC), oriented polypropylene (OPP), polyester PETG, other plastic, paper, or other material useful for labeling) with an exterior surface and an interior or contact surface (e.g., a surface for receiving the reflective surface and facing a viewer/framing element). The substrate of the mirror element may be clear, translucent, opaque, or a variety of clarity levels to meet the needs of a particular applications. Optional text or graphic box(es) may be printed or attached to the outer or back surface of the mirror element substrate, such as to provide product data, provide additional graphics, or the like.

As discussed above, the mirror element includes a reflective surface that may be formed of materials that function to reflect light that strikes it. In this regard, the reflective surfaces of the invention may be formed integrally with the substrate of mirror element or may be attached in a separate operation or provided or formed as a separate element. In these latter cases, the reflective surface may be a thin metallic foil, another foil such as a metallized nylon, a metallized PET film, or similar foil that has reflective properties, a deposited coating, or any other single material or combination of materials that produce a reflective surface, which may in some cases even include coatings that provide a different index of refraction at the reflective surface.

A primary or central image may be printed or otherwise positioned or provided on or proximate to the reflective surfaces of the invention. The primary image in some embodiments is selected to be relatively squat or short (as measured along a longitudinal axis of the container) and to be relatively wide or fat. This is because when the image is viewed through the sidewall of the container (and front label or framing element) and any liquid in a container, it may appear to be narrower than provided on or near the convex reflective surface. This can be thought of as "pre-distorting" the image such that it appears with more expected or desired proportions when viewed. The image may be a printed image or, in some embodiments, the primary image may be an image provided with electronic displays (such as liquid crystal displays, flat screens, or the like) and/or may be an "object." An object being understood to mean nearly any non-print or monitor/display image such as a 2D or 3D object mounted or provided on or proximate to the reflective surface. For instance, the object used for the primary image may be a coin, a pressed flower, a butterfly or insect specimen, or nearly any other object, and in these embodiments, it may be useful or even necessary for the reflective surface to be spaced off of the side wall (such as when the sidewall is concave in cross section as would be the case of conventional bottle or similar container) and, in such containers, the convex—spherical or elongate—reflective surface may be positioned within the chamber or void space defined by the sidewalls (e.g., within the contents of the container in some cases).

The container may be empty (or only contain air) or it may be filled. If filled, the liquid, solid, or other material contained therein may be relatively opaque causing the primary image to be only visible when the liquid is removed or the liquid may be transparent or translucent such as water, carbonated, alcoholic, or other beverages, or a consumer product such as shampoo, soap, bubble bath, perfume, mouthwash, toothpaste, hair gels, sanitizers, or the like. The invention is not limited to use with a particular liquid or content for the containers, but it may be more effective in creating a desired image with particular clear, substantially transparent, or translucent liquids or solids (e.g., liquids or solids that allow a significant or only a small amount of light through and that are clear or tinted with color).

The visual display assembly may also include, as discussed with reference to FIGS. 1-9, a framing element. For example, the framing element may be provided with a separate label formed from a clear or translucent substrate, e.g., a thin layer of a clear plastic or similar material, that is attached with adhesive to the sidewall of the container, e.g., the adhesive may be provided as a thin layer on the label or about the exterior/boundary of the framing element. The framing element may have an exterior surface and an interior surface (that is near or abuts the exterior surface of the container in label or similar applications). The exterior surface may be opaque of substantially opaque (such as by coloring it white or one or more other colors) and include one or more foreground images or patterns. The exterior surface or opaque frame on the exterior or interior surface defines a viewing portal or window that is transparent or translucent, i.e., does not include the ink or printing that makes the frame portion opaque. Alternatively, the framing element may be formed from a single layer of translucent or semi-opaque material with window formed as an opening through the material of framing element.

The portal or viewing window of the invention may be used to guide or direct a viewer's line of sight through the framing element, through a container wall (and any contents contained therein or in the interior container chamber), and to the reflective surface and the primary image. The shape of the port may be oval or the shape may be circular, square, rectangular, triangular, or other shapes. In some cases, the window or port may have an irregular shape (and may even include some foreground images) as shown in FIGS. 7A and 7B. The viewing window typically is selected to be the same size or smaller than the primary image although this is not a requirement with it being larger in some cases and also may have a shape similar to that of the primary image but, again, this is not a limiting design parameter. Generally, the viewing window is selected to have a size and shape that minimizes or controls the amount of mirror or reflective surface that is not "covered" by the foreground images and/or framing element so as to enhance the achieved imagery or illusion (e.g., by reducing reflections of a viewer and other objects outside the container). The viewing window may be permanently opened or may be covered with a removable cover or flap (not shown) that allows a user to open or expose window when desired.

On the interior surface of the framing element, one or more background images may be provided, and these images may be printed or otherwise attached to the interior (or inward facing) surface or, in some cases, be provided as separate elements from the interior surface. The background images are positioned adjacent the viewing port and positioned so as to frame the primary image when viewed on the reflective surface through the viewing port. The background images may be printed in mirror image arrangement so that they appear reversed or transposed (i.e., "correct") when viewed in the reflective surface or are selected such that they appear correct or normal in the mirror. For example, stars may be used for the background images because they appear properly oriented when viewed directly or in a mirror or reflective surface. In other embodiments, exterior, front, or framing surface is not opaque and in these embodiments, the foreground and background images are typically visible directly as foreground images and through the reflective surface as background images behind the central image.

The foreground images (and frame/surface), background images, and primary image may be provided as decals, stamps, or labels in a separate operation, and/or these images may be printed onto labels or elements that are attached to the exterior portions of a container and/or inserted into hollow sidewalls, into the container chamber, and/or placed into receiving sleeves or shelves on or in the container. The particular process used for applying the images may be any of a number of printing techniques used in the labeling and packaging industries. For example, the images may be applied through flexographic printing as this type of printing is useful for applying thin uniform films of ink on plastic and other materials. Alternatively, rotogravure may be used to apply ink for the images to the mirror and framing elements. In other cases, screen printing, web printing, pad transfer printing, letterpress printing, jet printing, or some other technique of printing may be used to practice the invention. Foil or other material may be used for reflective surfaces that may be quite thin relative to the label or element substrates, which may be several mils thick. In other cases, the mirror element may be provided with a metallic foil, metallized nylon, metallized PET film, a reflective coating, or the like, which may be applied to the substrate of mirror element.

The width (or size) of the reflective surface may vary to practice the invention. There may be a space or gap between the mirror element and the framing element (e.g., between a front label and an interior positioned convex mirror element). The framing element may be mounted on a front portion of a container sidewall such as by using adhesive to attach the inner surface of the framing element to the exterior surface of the sidewall. The framing element may be mounted relative to the mirror element such that the viewing port or window guides a viewer's line of sight through the viewing port, the container and its contents to the primary image and convex reflective surface. This may be thought of as registering or aligning the port as well as foreground and background images with the mirror element and its reflective surface and primary image.

As discussed throughout this description, the visual display assembly and packaging concepts of the invention are useful with a wide variety of container materials and shapes. The containers may be filled with clear or translucent liquids, gels, solids, or gases to allow viewing when the containers are filled or may be used with opaque liquids, gels, or solids and provide display when the contents are at least partially moved or removed. For example, the container including a visual display assembly of the invention may include a sidewall (e.g., clear plastic, ceramic or glass) with a non-circular cross section such as with a first or front wall or portion that is flat (or only slightly curved) and a second or rear wall or portion that is a semi-cylinder with a semi-circular or arc cross section (or parabolic, elliptical, or the like in other embodiments not shown) such that the rear wall bulges toward the front wall (e.g., is convex). In such a container, a mirror element may be attached to the curved rear portion of the sidewall to also take on a curved or arced cross sectional shape that has a curvature of the rear sidewall, i.e., the mirror element is configured to be an elongate convex reflector. The mirror element may include a substrate that may be opaque or transparent with an outer surface distal from the sidewall, which may optionally include text or graphics visible from the outside of the container. A reflective surface may be provided on the inner surface of the mirror element substrate and may cover all or a portion of the substrate. A primary image may then be provided on or adjacent the reflective surface (e.g., to be surrounded by the reflective surface) and may be printed or attached directly to the reflective surface or to the rear portion.

A framing element may be mounted or provided on the flat, front portion of the container or device sidewall. The framing element may be similar to other framing elements described herein with background images that are provided adjacent to the exterior surface of the front portion. The label or framing element may include a transparent or translucent layer or substrate in which a viewing window or port is provided, e.g., with its shape and size defined by the positioning, size, and shape of the background images and the foreground images. The foreground images may be separate components as shown (e.g., a layer of ink, a decal, or the like) or may be viewed versions of one side of the background images. In use, the container or device directs a viewer's line of sight to the foreground images and through the port to the reflective surface where the background images are visible adjacent to and behind the primary or central image.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the visual display assemblies shown and described above include a single reflective surface with a single primary image and a single viewing window, but other embodiments may include more than one viewing window to direct a viewer's line of sight to one or more primary images provided on or proximate to one or more reflective surfaces. The images and reflective surface(s) may be provided on a smooth exterior surface of the container that is typically curved outward and inward, respectively, from the container, with adjustments to pre-distortions made to the printed images.

The illustrated embodiments generally show one or two labels being applied to a container so as to provide framing element of the visual display assembly and positioning the mirror element within the container's void space or chamber. However, it will be readily understood by those skilled in the packaging and printing industries that the visual display assembly or portions thereof may be provided by other methods such as printing directly on a container sidewall or by deposition techniques. For example, the background images and primary images may be printed or deposited on the interior or exterior surfaces of the sidewalls followed by applying or attaching a reflective surface or layer over the primary image and a framing element with a viewing port over the background images. Alternatively, the framing element may be provided by deposition while the primary image and mirror element are provided by labeling techniques or any combination of such printing, deposition, or labeling methods may used to form containers or objects of the present invention. Also, certain embodiments of the invention provide one or more of the components of the visual display assembly within the container sidewalls such as on an interior surface, as an integral part of such sidewalls (such as by providing 3D contouring of the interior and/or exterior surfaces of the sidewall), within the a multi-layer or multi-component sidewall (e.g., the background image, the primary image, and/or the reflective surface or other components may be sandwiched or otherwise provided between two layers (e.g., an inner and outer layer) of multi-part sidewall), or even within the void defined by the sidewalls.

In some embodiments, the foreground, background, and/or primary images may be provided in a manner that allows them to be changed. For example, a container may be configured such that one or more of these images is a decal, sticker, or the like that can be removed and replaced with a differing decal, sticker, or the like with a different image (e.g., allow a user to replace a primary image with a photograph of themselves to place them in the display). These embodiments may include having the primary image being provided on a sticker or decal (or separate label) that can be "plugged" in or inserted into a space in the reflective surface (such as by leaving a hole or gap in the substrate upon which the reflective surface is mounted or provided). Alternatively, the images may be adapted for alteration such as by coloring, painting, or the like or may be later provided by a consumer, e.g., by providing a space or canvas area upon which the images may be placed. In some cases, the images may be provided using electronics rather than printing such that they may be changed (e.g., by changing a screen provided on the reflective surface or in the framing element to show differing images from memory). For example, the primary image or primary image element may be provided with a liquid crystal display (LCD), a flat screen, or other electronic display device. In some cases, a flexible electronic display such as a flexible LCD may be used as the primary image element.

The invention provides an optical illusion assembly (or visual display assembly) that may take the form of a label or labels, decals, and other packaging and a lens system that may take the form of a container as discussed above or take other forms as described below (e.g., solid transparent objects or the like). The optical illusion assembly includes a primary image provided on or near a mirror element with a reflective surface. The reflective surface is typically at least slightly or partially curved (at least on one axis) or is non-planar. Often, this is achieved by providing the reflective surface on a conformable mirror element (e.g., a metallic layer, metallized plastic, or the like) on or attached to a thin, flexible plastic layer such as is found in wraparound labels attached to plastic containers. The reflective surface may, in these cases, be applied to a container or other object so as to take on the curve or shape of the outer surfaces of the container or object walls. In contrast, prior devices using mirrors generally used rigid, planar mirrors (e.g., mirrors set at 45 degrees from a front exterior surface) and often only achieved their effects by placing three dimensional objects within the container or lens portion (such as in cubes with mirrors). The curved mirror of embodiments of the present invention provides significant improvements by better disguising or hiding that a viewer is looking at a mirror.

The optical illusion assembly and lens system of the invention achieve several desirable results. The reflective surface with the proximate printed image and distal foreground images along with the optical characteristics of the lens system create the illusion that the printed image appears in front of the reflective surface such as inside a container or other object. However, the configuration described above (such as with reference to FIGS. 1-9) also creates an illusion that is primarily viewable through the viewing port or portions of the container or object opposite the reflective surface. Hence, when a viewer chooses a viewing angle or line of sight not through the viewing port or frame about such a port, the viewer typically cannot see the primary image or at least the image does not appear to be projected within the container or object. This "disappearing" image furthers the illusion achieved by the present invention. For example, if the container 700 of FIGS. 7A and 7B is viewed from the top or bottom (e.g., upward or downward into the bottle), the image 729 is not visible within the container walls 712 while the image 729 is clearly visible through port 738 and appears to be within the container walls 712.

Yet further, the invention provides a self-animating illusion in that as the container or object is moved or the viewer moves so as to change the line of sight or viewing angle through the viewing port the primary image being projected also appears to move or is animated, which can be heightened with the assemblies shown in FIGS. 3-5. This illusion is achieved in some embodiments due to the combined use of a curved reflective surface and cylindrical lens (e.g., container walls and contents). In these embodiments, the change in viewing angle results in the primary image moving relative to the foreground images and the reflected background images. This self-animation effect improves the illusion by better detaching the primary image from the surface of the mirror and from the foreground images and reflected background images. In many cases, the sidewalls of the container or body of the object on or in which the visual display assembly is provided will be substantially transparent or translucent light to allow a viewer to see through the sidewalls and the interior of the container (which may be filled with liquid or solid that adds to the optical effect by providing more lens material or that is colored or opaque). However, it may be desirable to only provide a portion of such sidewalls that are transparent or translucent. For example, the sidewall may be translucent where the mirror element or only its reflective surface is positioned and where the framing element or only its viewing port or window is positioned or provided, and some or all of the rest of the sidewall or object body may be less transparent to opaque.

The above description describes in detail the use of the inventive concepts of a visual display assembly that includes a convex reflective surface (e.g., a curved or nonplanar mirror) with a proximate primary image, foreground and/or background images and a lens or optical system to achieve desirable optical imagery in containers. However, these inventive concepts can readily be expanded to non-standard "containers" and many other objects and products. In some embodiments, the sidewall opposite the reflective surface is textured to create the viewing port and to create the foreground and background images. For example, one or more smooth areas may be provided on the front sidewall to provide one or more viewing ports or windows and shapes may be provided as raised or recessed surfaces in the sidewall. These textured shapes or surfaces are then seen in the foreground as images and also reflected from the reflective surface (e.g., mountains, stars, clouds, or nearly any other shape/design such as a cave or other design). These textured surfaces or shapes about the viewing port/window(s) may be provided in the sidewall during fabrication of the container (such by providing a particular mold for use in blow molding or the like) or later attached in a separate operation (e.g., a plastic label with a three dimensional surface may be attached to a container sidewall). Again, the images described herein may be provided by deposition techniques and by techniques that add or remove materials from surfaces (such as the interior or exterior surfaces of label substrates or sidewalls of containers or surfaces of objects).

In another example, visual display assembly may be provided as a more rigid package assembly rather than as with a thin flexible label or labels. This may involve providing a single piece or package assembly that is formed of plastic, ceramic, glass, or other material (or includes such transparent or translucent materials at least in the viewing port portion). The package assembly may have a cylindrical, oval, clamshell, or other cross section. The sidewalls are typically relatively rigid, such as 15 to 20 thousandths or more of plastic, ceramic, glass, or other material. This package assembly includes the framing element with the view port, foreground images, and background images and also the reflective surface and primary image (which may also be provided on or in the package contents). The sidewalls of this package assembly may provide the lens for the assembly and contents may be placed within the package assembly. In other cases, a lens element is inserted inside the container sidewalls with the sidewalls acting as a sleeve that fits over the lens element or as a shell (e.g., two halves of a clam shell or the like) that are closed on or wrapped about a lens element. The lens element may be a bottle or container or take on other forms, such as a solid object such as a rod or cylinder formed of plastic, ceramic, glass, or the like. The sidewalls of the package assembly may configured to mate tightly or closely with the sidewalls or, in some cases, a space is left between one or both of the front and back sidewalls so as to achieve a differing visual effect (e.g., to achieve a 3D effect).

Because the number and variety of products that may incorporate the present invention are numerous it may be useful to list a representative group of products that are considered to be covered within the breadth of the above description and language of various ones of the following claims. A "container" is intended to be relatively broad term and include nearly any object with walls having exterior surfaces and may include objects that are solid with the container walls defining the shape and size of the object. The visual display assembly is then typically applied or provided on the exterior surfaces of such an object. In other cases, the visual display assembly may be provided as part of one of these walls or even be provided on interior surfaces. Products that may utilize the container and visual display assemblies of the invention include, but are not limited to, bubble bath, shampoo, and other consumer product bottles or containers, baby bottles, aquariums, sport bottles, pens, perfume containers, windshield fluids, translucent oil containers, toys with cylindrical or non-planar surfaces such as teething devices, rattles, and the like, beach balls, floatation devices, and other inflatable toys and objects, syringes, intravenous pouch, glue tubes/packages, globes (e.g., snow globes that may include 3D objects in the container and floating objects such as glitter in the contained liquid), home/business water bottles and purifiers, consumer water bottles, cups, and carbonated beverage containers.

When it is understood that the inventive concepts described herein are applicable to non-standard containers and objects that may be solid, the listing of products and apparatus that may incorporate a visual display assembly of the invention can be expanded even further. The following is a non-exclusive listing of other products that may incorporate a visual display assembly: ornaments, devices with LED or other sources of light for lighting the interior of the "container," an alarm clock, floating/animated time face devices, floating plasma-type TVs and electronics, lamps, comic books, jewelry, key chains, and the like.

Further, these non-standard container embodiments and the container embodiments (such as those shown in FIGS. 1-7) may be adapted to achieve additional effects or to have additional features. For example, light sources such as LEDs or the like may be provided on or within the container or assembly to light the container contents or to light one or more of the images so as to achieve a desired effect (e.g., to selectively illuminate portions of the image with the light source). Other supplementary lighting such as conventional table lamps, flashlights, or lighted display stands/cases may be used to increase the quantity or quality of available light. The use of supplementary lighting increases the quantity of light available to produce the illusion and may improve the quality of the illusion, compensate for lower reflectivity films, and/or allow for darker images or designs whose performance would be limited by relying on ambient lighting alone. Supplementary lighting may be modulated to provide colors and/or polarization or other qualities that are not readily controlled with ambient light alone and, therefore, enable a wider variety of visual effects.

The visual display element or portions of such a display element may be replaceable to allow one or more of the images to be changed. Alternatively, the visual display assembly or portions of it may be moveable (e.g., the assembly may be provided on a label or sleeve that can be rotated about the periphery of the container), which may be used to change the images being displayed (e.g., change the foreground and background images and/or change the primary image). The visual display assembly may include multiple viewing ports and/or reflective surfaces so as to provide multiple panels for showing differing images and/or for telling a story. In some embodiments, the container sidewall, the label material, the image ink, and/or the container contents may be temperature sensitive so as to change with varying temperatures (e.g., show a different character, changed character, different/ changed background and/or foreground images, and the like in different temperature ranges). The images used in the visual display assembly may be printed with ink to allow them to be seen in the dark (i.e., glow in the dark effects) or under a black light.

The images used in particular implementations may be aesthetic, entertaining, and/or informational. For example, the images may contain a barcode that implements a game piece, coupon, or UPC code that is secure because it is formed facing toward the inside of a container. A security image (e.g., a barcode) may comprise portions of the primary image, foreground image, and/or background image all of which must be present in a composite image. This not only inhibits tampering with the security image itself but also can provide some confirmation of product/container integrity as the composite image can be made to be very sensitive to container damage or changes in the contents. The images can be used to display product information such as ingredients, nutritional information, directions for use, and the like. The images can be contextually tied to the product (e.g., floating lemons in a lemon flavored beverage) or contextually unrelated to the product (e.g., cartoon characters or film promotional images inside a cup).

The visual effects may be achieved in container, objects, or a variety of "optical illusion devices" that may be useful for containing a product or simply be useful for generating the desired multi-dimensional effects. For example, an apparatus is provided that includes a mirror element and a framing element (e.g., a visual display assembly). The mirror element includes a reflective surface or reflector element with a curved shape (e.g., a convex shape relative to a viewing window or framing element) and also includes a primary image contacting the reflective surface and conforming, at least partially, to the curved shape of the reflective surface. For example, the reflective surface may have a semi-circular cross section and be elongate or be a spherical, convex mirror and the image would conform to this shape, and in some cases, the curve is outward in the apparatus or the reflective surface may be considered convex relative to a central axis of the apparatus. The framing element is spaced apart from the mirror element and includes a background image element positioned to face toward the reflective surface. The framing element also includes a view port proximate to the background image that is transparent or substantially transparent and is positioned generally opposite the primary image so as to provide a line of sight through the framing element to the reflective surface and the primary image. The apparatus further includes a lens sandwiched between the mirror and framing elements and, in some embodiments, the lens has a cylindrical body (or body with curved surfaces for mating with framing and mirror elements) that may be formed of a transparent or translucent plastic, ceramic, glass, or other material.

The apparatus may also include light source, such as light emitting diode (LED), that selectively transmits light (white or colored light) into the lens, e.g., the generated light may be directed onto the primary image and/or the background image or generally into the lens or space between the framing and mirror elements. The background images may be printed images (e.g., be formed with ink) and/or may be formed with the use of raised and/or recessed contours or portions that generate a particular reflected image from the reflective surface. In some cases, the framing element and the mirror element are provided in a packaging assembly that is applied to or about the exterior surfaces of the lens (e.g., as a one or two part label or as part of a container or package made of plastic or the like that is used to at least partially encapsulate the lens, which may be a unitary body, a shell or container filled with liquid such as a bottle, a globe, or the like, or take other forms). The invention may be thought of as "multi-effect" in that: the reflective surface creates a floating/centering effect for a primary image or object through reflected background image(s) and distortion; the optics of containers and objects configured according to the invention support this centering of a primary image and also may create an animation effect through point-of-view (POV) image shift and distortion. The optics of the containers or objects also create a disappearing effect by "erasing" the image between the minor and sidewall through total internal reflection when the container or object is viewed through an off-angle surface (e.g., not viewed through the viewing port/window or framing element).

According to another aspect, an item is provided for creating an optical illusion or display. The item includes a convex reflective element, a primary image, and a framing element. The primary image is provided proximate to the reflective element and positioned such that the primary image and reflective element can be viewed together over a range of viewing angles. The framing element is provided to permit viewing or views through to the reflective element at the range of viewing angles. For example, a line of sight may be provided through the framing element to the reflective surface and the primary image. This line of sight (or a plurality of such lines of sight) may be available or provided by the framing element over a range such as 0 to 270 degrees, 0 to 180 degrees, 0 to 90 degrees or the like relative to the primary image. Alternatively, such a viewing angle may be measured relative to a plane passing perpendicularly through the primary image and then, providing a range of about 0 to 135 degrees in both directions or more typically from about 15 to 45 or more degrees in both directions. The primary image may be printed or painted on the reflective element or attached to the reflective element in some embodiments. An opening may be provided or formed in the reflective element with the primary image being positioned behind the reflective element to be viewed through the framing element and the opening in the reflective element. The primary image in contrast may be in front of the reflective element (e.g., provided between the reflective element and the framing element). The reflective surface or element may be a metal layer or, in some cases, be formed of paint. The invention includes assemblies including the item such as labels, containers, bottles, pens, toys, novelty products, and the like.

As discussed above, the primary image may be provided and/or generated in numerous ways to successfully implement embodiments of the invention. In many embodiments, the primary image is provided as art work, decals, labels, and the like that is applied to the reflective or mirror surface while in other cases such a primary image is provided behind the reflective surface or layer. In the latter cases, the reflective surface may itself have an opening or hole to expose or allow viewing of the primary image. Instead of a hole or opening in the reflective surface or mirror, the reflector may have a portion that is translucent or transmissive to light and the primary image may be projected through the reflective surface. Hence, LEDs or other light sources may be used to light a primary image provided behind the translucent or transmissive portion of the reflective surface. In other cases, an electronic display device may be provided behind the reflective surface such as a LCD or similar display and images it displays or "projects" may be seen through an opening or hole in the reflective surface or through a translucent/transmissive section of the reflective surface. For example, the primary image 629 of the assembly 600 of FIG. 6 may be provided by providing an opening in the reflective surface 628 and placing an LCD or other display behind (or distal to framing assembly 620) the reflective surface 628. In other cases, the portion of the reflective surface 628 through which the primary image 629 is displayed may be transmissive to light and an image may be placed behind this transmissive portion and light from an LED or other light source may be used to cause the primary image to be seen to a viewer looking through the window 638 of the framing element.

Figure 10:
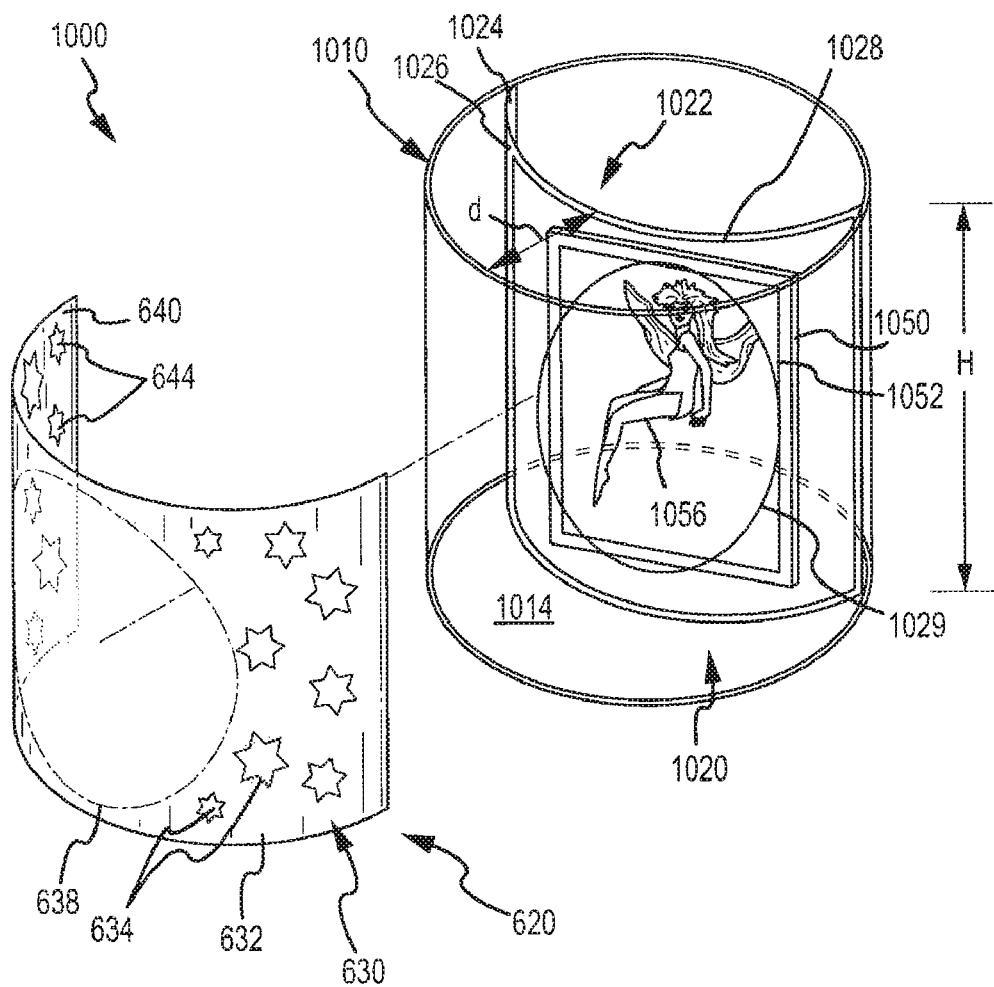
Figure 11:
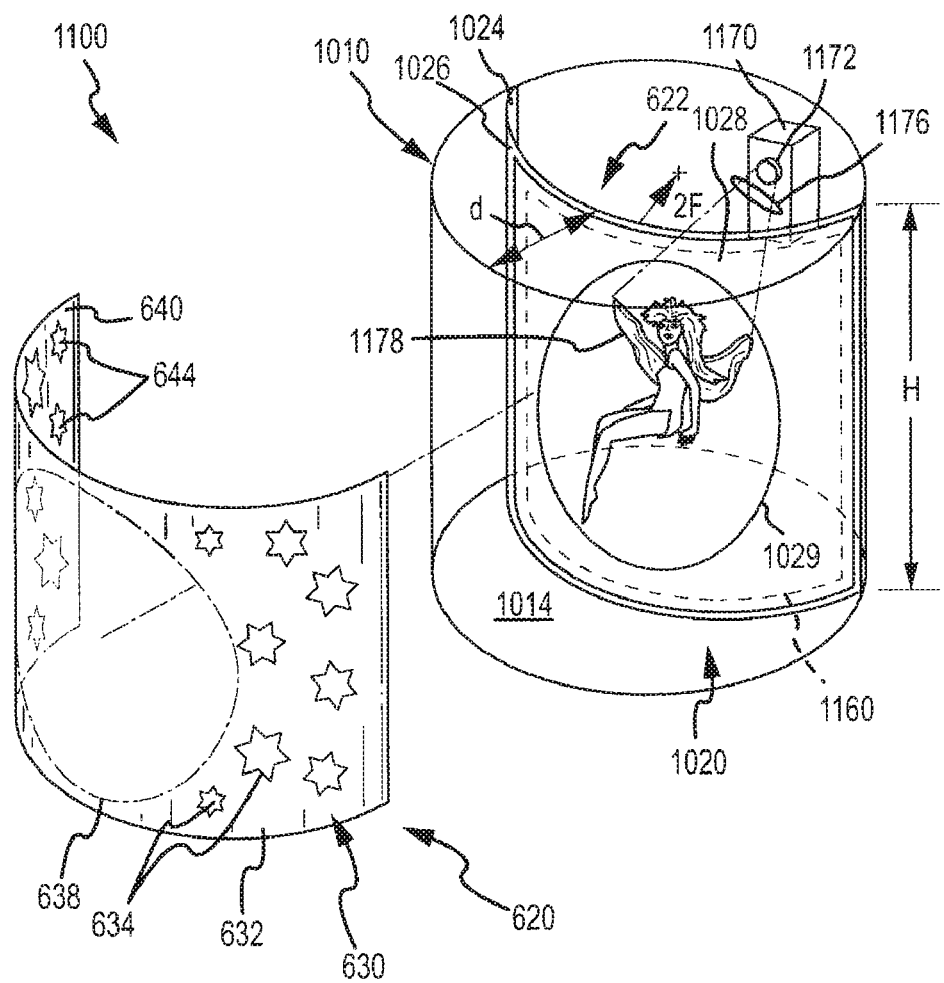

With the above discussion in mind, it may be useful to describe these embodiments of the invention with reference to FIGS. 10 and 11. FIG. 10 illustrates an optical illusion device or assembly 1000 that makes use of a display device 1050 to provide the primary image 1056. The device 1000 includes a visual display assembly 1020 with a frame element 630 similar to that shown in FIG. 6 (with like elements having the same numbers). The body 1010 may be solid with a froth portion or sidewall 1014 upon which the frame element 630 may be attached or provided, or, the body/container 1010 may be a hollow, walled container with a sidewall as shown with a circular or oval cross section (e.g., providing a tubular vessel) or may take other cross sectional shapes (e.g., a square, a rectangle, or other shape for sidewalls of a visual display device). As with device 600, the device 1000 includes a mirror element 1022 that is positioned at an offset distance from the front portion 1014 and attached frame element 630. The mirror element 1022 may be arranged or positioned to be substantially planar or to be curved. The illustrated arrangement for the mirror element 1022 is a curved, convex surface but other embodiments may provide a concave cross section to achieve a desired visual effect (e.g., this description is not limited to the arrangement shown but covers planar elements 1022 (and framing elements) as well differing cross sectional shapes). Further, a rectangular mirror element 1022 is shown, but the mirror element 1022 may take many other shapes such as other polygonal shapes or a circular, oval, or similar shape such as shown in FIGS. 1-5, 8, and 9.

The mirror element 1022 has a substrate with a back surface 1024 and a front surface/side 1026. An opening or hole 1029 in the substrate extends from the back surface 1024 to the front surface 1026 through which light may pass and a viewer is provided a line of sight through the framing element 630 through the wall/contents of body 1010 through this hole/opening 1029. Of course, the opening 1029 may take numerous shapes and be of nearly any size to practice the invention. As shown, the opening may be oval or elliptical or it may be circular or a polygonal or even an irregular shape (or multiple holes/light passages may be provided in some embodiments (not shown)). Typically, the shape and size of hole 1029 is selected to be about the shape and size of a displayed primary image 1056 and/or the shape and size of a viewing window 638 in the framing element 630. The mirror element 1022 includes a reflective or mirrored surface 1028 on the front surface or side 1026 of the mirror element substrate, and as with other embodiments, the reflective surface 1028 faces or is exposed to the framing element 630. The opening 1029 extends through the reflective surface 1028 (or the surface 1028 frames or extends about the periphery of the opening 1029).

By providing an opening 1029 that is framed by reflective surface 1028, the device 1000 may be used to display a primary image, which may be a still image (that may be changed) or an animated or video image. As shown, an image display/generation mechanism 1050 is provided in the display assembly 1020 and positioned behind the mirror element 1022 (e.g., the mirror element 1022 is positioned between the mechanism 1050 and the framing element 630). The mechanism 1050 may be positioned external to the body 1010 (such as on or near a side or wall opposite or distal the front portion or sidewall 1014) and "project" the image into the body 1010 and through the hole/opening 1029. As shown, though, the mechanism 1050 is positioned within the body or container 1010. The mechanism 1050 includes a display screen 1052 such as an LCD or plasma television-type screen, or any other display useful for displaying images (still or video images). The display screen 1052 is typically larger than the opening 1029 and positioned behind the opening 1029 such that a viewer looking through the window 638 and opening 1029 generally only sees the screen 1052 and not other portions of the mechanism 1050. The mechanism 1050 is configured or selected to operate to display or create a still or video image upon the display 1052 that provides the primary image 1056. For example, the mechanism 1050 may include memory (or a detachable/pluggable memory stick or other device) storing one or more digital still images or digital video images and be adapted to operate to display the primary image 1056 on screen 1052. In some cases, the device 1050 may be operable by a user of the assembly 1000 (e.g., with a switch or the like not shown) or may be operable in response to some stimuli or sensed environmental condition (e.g., operate when the assembly 1000 is moved, placed in a dark environment, and so on).

In some embodiments, a rear projection arrangement is used to provide or generate the primary image. FIG. 11 illustrates one embodiment of an optical illusion device or assembly 1100 using rear projection (RP) to provide a primary image 1178 visible concurrently with framing elements 644. As shown, the assembly 1100 may include a display assembly 1020 with a mirror element 1022 and a frame element 630 as shown for the assembly 1000 of FIG. 10. In this embodiment, the mirror element 1022 includes an opening or hole 1029 that is framed or surrounded by reflective surface 1028. But, instead of a display mechanism with a screen, a translucent or light transmissive screen (or RP screen) 1160 is provided at least in the location of the hole/gap 1029 and more typically of a larger size to extend beyond the hole 1029 to provide an attachment surface between the screen 1160 and back or rear surface 1024 of the mirror element substrate. For example, a sheet of paper vellum (colored or white) may be attached to the back side 1024 of the mirror element 1022 to at least cover the hole 1029. Other translucent or light transmissive materials may be used for the RP screen 1160 with vellum providing one useful material and the shape of the screen may match the hole 1029 or be a differing shape such as the shape of the reflective surface 1028.

A projector 1170 is provided in the container 1010 (or outside the container 1010 directing its light inward to the RP screen 1160). The projector 1170 may be selected to provide a desired effect and/or to have a physical profile (size and shape) suiting available space in the container 1010. For example, a projector of the size used in current cellular phones, digital cameras, or the like may be used (e.g., a small projector with a brightness of several lumens to 20 lumens or more) or a higher quality, higher brightness projector may be used such as one that projects at up to 100 lumens or more and may be up a 3-inch by 1-inch by 2-inch rectangle or some other relatively large (or larger size). Hence, the size and configuration of the assembly 1100 may be varied widely to practice the invention. More importantly, the projector 1170 is configured to project light or an image 1176 from a lens 1172 and onto the back of the RP screen 1160. Because the screen 1160 is translucent or transmissive of light (e.g., at least a portion of the image light or projected image 1176) is transmitted through the RP screen as the primary image 1178. This projected primary image 1178, as with other described embodiments, is then visible to a viewer through the window 638 concurrently with the reflective surface 1028, which reflects back background images 644 to the viewer. Again, the images 1176 projected from projector 1170 may be still images that can be selected by a user and/or changed over time such as with a random slide show or a sequence of still images according to a preset pattern. In other cases, the images 1176 are video images, and the still or video images may be retrieved from memory (or memory devices attached to or inserted into) of the projector or fed wirelessly or by connecting cable/wire to the projector 1170.

In one embodiment developed by the inventor, an animated video image was projected from a projector onto a piece of vellum that functioned or served as RP material or a RP screen. The vellum RP screen may be layered right behind the mirror, which in this embodiment did not include the hole or window shown in FIGS. 10 and 11. For example, a layer of vellum or other translucent/transmissive material may be applied, with the same or differing shape/size as the reflective surface, to the back surface of the mirror element substrate. The mirror element or substrate may be partially metallized (such as to perform like one-way glass). In this case, the image projected onto the vellum RP screen bleeds or is partially transmitted through the vellum layer and the mirror substrate/reflective surface. Concurrently, the reflective surface (or mirror element substrate) as viewed from the front through the framing element is able to reflect the framing imagery such as background elements. Such an RP screen embodiment is useful for many display applications in part because the image can be an emissive, animated image and the projection source or projector is hidden from view. Such an image generation method and assemblies may be implemented with any of the shapes of the mirror element and corresponding reflective surface such as with concave, convex, cylindrical, spherical, and other mirror elements (with or without holes in the reflective surface). In other words, any of the embodiments described herein may be modified so as to provide the primary image as described above and/or in FIGS. 10 and 11 with an RP layer or screen, the reflective surface provided as a partially metallized reflector (or reflector with a hole), and a primary image provided or projected with a projector (or display mechanism). The devices using display mechanisms and/or projectors may be well-suited for high-end holographic-like displays and illusion assemblies/products.

I claim:

1. An apparatus for providing a multi-dimensional visual display, comprising:
   a body having a front sidewall;
   a mirror element spaced apart from the front sidewall within an interior portion of the body, the mirror element comprising a reflective surface facing the front sidewall that is convex relative to the front sidewall; and
   a primary image element proximate to the reflective surface between the reflective surface and the front sidewall, wherein the primary image element and the reflective surface are visible through at least a portion of the front sidewall,
   wherein the primary image element is a printed image provided on the reflective surface and the reflective surface is elongate with an arcuate cross section when viewed along a longitudinal axis of the body,
   wherein the body comprises a rear sidewall and the front and rear sidewall define an inner chamber for receiving a liquid, the mirror element being positioned within the inner chamber,
   wherein the apparatus further comprises a cover mating with an opening at an end of the body and an inlet tube extending from the cover into the chamber, and
   wherein the mirror element extends along and is attached to the inlet tube, whereby the inlet tube is concealed from view through at least portions of the front sidewall.

2. The apparatus of claim 1, wherein the interior portion of the body comprises a unitary piece of plastic, ceramic, or glass and the mirror element is mounted within the unitary piece of the body.

3. The apparatus of claim 1, further comprising a framing element proximate the front sidewall, the framing element comprising one or more background image elements facing toward the reflective surface on the mirror element.

4. The apparatus of claim 3, wherein the framing element further includes a substantially transparent viewing window free of the background images and through which a line of sight is provided through the body to the reflective surface of the mirror element.

5. The apparatus of claim 4, wherein the framing element further comprises a foreground image element defining outer boundaries of the viewing window and facing away from the reflective surface, whereby the background images are viewable through the viewing window via the reflective surface.

6. The apparatus of claim 1, further comprising a light source generating light for illuminating at least the primary image.

7. An apparatus for providing a visual display, comprising:
   a body having a front sidewall;
   a mirror element spaced apart from the front sidewall within an interior portion of the body, the mirror element comprising a reflective surface facing the front sidewall that is convex relative to the front sidewall;
   a primary image element proximate to the reflective surface between the reflective surface and the front sidewall, wherein the primary image element and the reflective surface are visible through at least a portion of the front sidewall;
   a framing element proximate the front sidewall, the framing element comprising a background image element facing toward the reflective surface on the mirror element;
   a cover mating with an opening at an end of the body; and
   an inlet tube extending from the cover into the body.

8. The apparatus of claim 7, wherein the apparatus further comprises, and further wherein the mirror element extends along and is attached to the inlet tube, whereby the inlet tube is concealed from view through at least portions of the front sidewall.

9. The apparatus of claim 7, wherein the framing element further includes a substantially transparent viewing window free of the background image element and through which a line of sight is provided through the body to the reflective surface of the mirror element.

10. The apparatus of claim 9, wherein the framing element further comprises a foreground image element defining outer boundaries of the viewing window and facing away from the reflective surface, whereby the background images are viewable through the viewing window via the reflective surface.

11. The apparatus of claim 7, further comprising a light source generating light for illuminating at least the primary image.

12. The apparatus of claim 7, wherein the primary image element is a printed image provided on the reflective surface and the reflective surface is elongate with an arcuate cross section when viewed along a longitudinal axis of the body.

13. The apparatus of claim 12, wherein the body comprises a rear sidewall and the front and rear sidewall define an inner chamber for receiving a liquid, the mirror element being positioned within inner chamber.

14. The apparatus of claim 12, wherein the interior portion of the body comprises a unitary piece of plastic, ceramic, or glass and the mirror element is mounted within the unitary piece of the body.

* * * * *